United States Patent
Kanematsu

(10) Patent No.: US 7,969,328 B2
(45) Date of Patent: Jun. 28, 2011

(54) NAVIGATION APPARATUS AND PROGRAM OF THE SAME

(75) Inventor: Osamu Kanematsu, Nagoya (JP)

(73) Assignee: Denso Corporation, Kariya (JP)

( * ) Notice: Subject to any disclaimer, the term of this patent is extended or adjusted under 35 U.S.C. 154(b) by 219 days.

(21) Appl. No.: 12/232,473

(22) Filed: Sep. 18, 2008

(65) Prior Publication Data

US 2009/0037090 A1 Feb. 5, 2009

Related U.S. Application Data

(62) Division of application No. 11/285,603, filed on Nov. 23, 2005, now Pat. No. 7,456,757.

(30) Foreign Application Priority Data

Nov. 26, 2004 (JP) ................................ 2004-342113
Nov. 26, 2004 (JP) ................................ 2004-342114

(51) Int. Cl.
 *G08G 1/123* (2006.01)
(52) U.S. Cl. ................ 340/995.1; 701/117; 701/200
(58) Field of Classification Search ............... 340/995.1, 340/995.11, 995.13; 701/117, 118, 210, 701/200, 209
See application file for complete search history.

(56) References Cited

U.S. PATENT DOCUMENTS

| | | | |
|---|---|---|---|
| 5,919,246 A * | 7/1999 | Waizmann et al. | 701/209 |
| 6,263,276 B1 | 7/2001 | Yokoyama et al. | |
| 6,295,503 B1 | 9/2001 | Inoue et al. | |
| 6,684,156 B2 | 1/2004 | Fujimoto et al. | |
| 6,697,717 B2 * | 2/2004 | Shioda et al. | |
| 6,701,249 B1 | 3/2004 | Casino | |
| 6,751,549 B1 * | 6/2004 | Kozak | 701/209 |
| 6,947,839 B2 * | 9/2005 | Uotani | 701/210 |
| 6,959,282 B2 | 10/2005 | Kakihara et al. | |
| 7,031,829 B2 | 4/2006 | Nisiyama | |
| 7,194,356 B2 | 3/2007 | Sano | |
| 7,251,560 B2 | 7/2007 | Ogasawara et al. | |
| 7,526,377 B2 * | 4/2009 | Wiener et al. | 701/200 |
| 2001/0001848 A1 * | 5/2001 | Oshizawa et al. | 701/210 |
| 2004/0024523 A1 | 2/2004 | Uotani | |
| 2005/0038596 A1 * | 2/2005 | Yang et al. | |
| 2005/0168351 A1 | 8/2005 | Saze et al. | |

(Continued)

FOREIGN PATENT DOCUMENTS

EP 1 297 982 A3 * 4/2003

(Continued)

OTHER PUBLICATIONS

Examination Report of Dec. 18, 2009 issued from the British Intellectual Property Office in the corresponding British patent application No. GB0524051.0.

(Continued)

*Primary Examiner* — George A Bugg
*Assistant Examiner* — Edny Labbees
(74) *Attorney, Agent, or Firm* — Posz Law Group, PLC

(57) ABSTRACT

A navigation apparatus of a vehicle includes: storage means for storing information about the vehicle and a road area; and guide route calculating means for calculating a guide route on the basis of the information stored in the storage means. The navigation apparatus determines whether to avoid an entry of the vehicle into the road area on the basis of the information about the vehicle and the road area.

8 Claims, 13 Drawing Sheets

U.S. PATENT DOCUMENTS

2005/0251327 A1\* 11/2005 Ogasawara et al.
2006/0167626 A1\* 7/2006 Hashizume ................... 701/210

FOREIGN PATENT DOCUMENTS

| | | | |
|---|---|---|---|
| GB | 2 413 382 A | \* | 10/2005 |
| JP | A-11-83514 | | 3/1999 |
| JP | B2-3384293 | | 3/1999 |
| JP | A-11-183188 | | 7/1999 |
| JP | A-2001-319252 | \* | 11/2001 |
| JP | A-2002-181571 | | 6/2002 |
| JP | A-2002-310701 | | 10/2002 |
| JP | A-2003-322536 | \* | 11/2003 |
| JP | A-2004-053492 | | 2/2004 |
| JP | A-2005-18247 | | 1/2005 |
| JP | A-2005-77333 | | 3/2005 |

OTHER PUBLICATIONS

Office Action dated Jun. 1, 2009 from the Great Britain Patent Office in the corresponding GB Application No. 0524051.0.

Search Report from Great Britain Patent Office issued on Apr. 25, 2006 for the corresponding Great Britain patent application No. GB0524051.0 (a copy translation thereof).\*

Office Action dated Oct. 13, 2009 from Japan Patent Office in corresponding JP patent application No. 2004-342114 (and English translation).

\* cited by examiner

FIG. 1
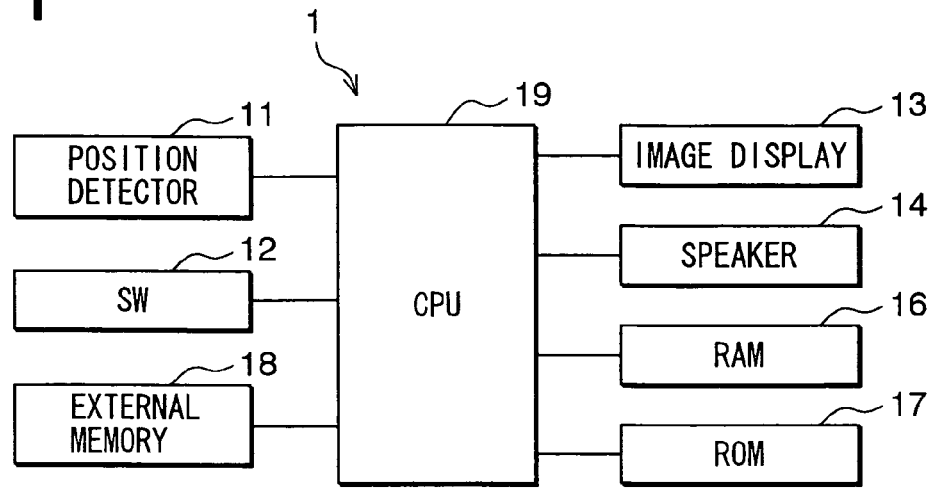
FIG. 2
| OCT. 10 | PAID |
| OCT. 11 | UNPAID |
| OCT. 12 | UNPAID |
| OCT. 13 | PAID |
| OCT. 14 | UNPAID |
FIG. 3
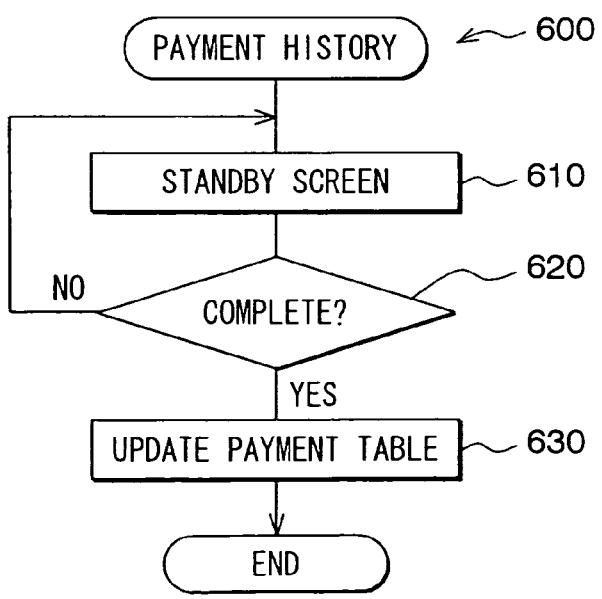

FIG. 16

| STARTING POINT AND DESTINATION | CHARGE FOR CURRENT DAY HAS BEEN PAID | CHARGE FOR CURRENT DAY IS UNPAID |
|---|---|---|
| STARTING POINT: INSIDE AREA<br>DESTINATION: INSIDE AREA | NOT CONSIDERING CHARGING AREA | ROUTE NOT ENTERING CHARGING AREA |
| STARTING POINT: INSIDE AREA<br>DESTINATION: OUTSIDE AREA | NOT CONSIDERING CHARGING AREA | ROUTE NOT ENTERING CHARGING AREA |
| STARTING POINT: OUTSIDE AREA<br>DESTINATION: INSIDE AREA | NOT CONSIDERING CHARGING AREA | NOT CONSIDERING CHARGING AREA |
| STARTING POINT: OUTSIDE AREA<br>DESTINATION: OUTSIDE AREA | NOT CONSIDERING CHARGING AREA | ROUTE NOT ENTERING CHARGING AREA |

FIG. 21

| STARTING POINT AND DESTINATION | AT LEAST ONCE ENTRY INTO CHARGING AREA ON CURRENT DAY | NO ENTRY ON CURRENT DAY |
|---|---|---|
| STARTING POINT : INSIDE AREA<br>DESTINATION : INSIDE AREA | NOT CONSIDERING CHARGING AREA | ROUTE NOT ENTERING CHARGING AREA |
| STARTING POINT : INSIDE AREA<br>DESTINATION : OUTSIDE AREA | NOT CONSIDERING CHARGING AREA | ROUTE NOT ENTERING CHARGING AREA |
| STARTING POINT : OUTSIDE AREA<br>DESTINATION : INSIDE AREA | NOT CONSIDERING CHARGING AREA | NOT CONSIDERING CHARGING AREA |
| STARTING POINT : OUTSIDE AREA<br>DESTINATION : OUTSIDE AREA | NOT CONSIDERING CHARGING AREA | ROUTE NOT ENTERING CHARGING AREA |

NAVIGATION APPARATUS AND PROGRAM OF THE SAME

CROSS REFERENCE TO RELATED APPLICATIONS

This application is a divisional of U.S. patent application Ser. No. 11/285,603, filed on Nov. 23, 2005 and entitled NAVIGATION APPARATUS AND PROGRAM OF THE SAME, and is based on Japanese Patent Applications No. 2004-342113 filed on Nov. 26, 2004, and No. 2004-342114 filed on Nov. 26, 2004, the disclosures of which are incorporated herein by reference.

FIELD OF THE INVENTION

The present invention relates to a navigation apparatus and a program of a navigation device.

BACKGROUND OF THE INVENTION

Conventionally, a navigation apparatus for calculating a guide route avoiding a specific road area such as an area which charges for entries, has been suggested in, for example, Japanese Laid-Open Patent Publication No. 2002-181571, Japanese Patent No. 3384293, and Japanese Patent No. 2003-35546. By use of such an apparatus, a route guide can be provided for bypassing the entry into a toll road, city area, and the like which charge for entry.

However, for a vehicle to be permitted to enter a road area, a charge for the entry into the road area needs to be previously paid. The above conventional apparatus cannot meet the case where the entry into the road area during a predetermined period is permitted when the charge is paid. As an example of a road area where an entry of a vehicle during a charging period is permitted when a charge is previously paid (hereinafter called a time limit charging road area), congestion charging areas are institutionalized in London.

In this institution, a person who wants to enter a congestion charging area by use of a vehicle previously makes a notification about a license plate of the vehicle, and previously pays a charge for a desired day. The payment information is notified to the authorities. The authorities collect license plate information about all the vehicles entering the congestion charging area. The authorities charge a penalty on an owner of a vehicle of a license plate not contained in the information about the payment for the entry day.

In such an institution, a guide route calculation for only avoiding an entry into a road area is insufficient. It is desirable that guide route calculating methods are switched in accordance with whether a user's vehicle has paid a charge for the day. Here, the user of the vehicle is, for example, a driver or a passenger of the vehicle.

Further, such a conventional technique cannot always appropriately respond to the case where a charge amount for an entry of a vehicle into a road area is determined in accordance with a past entry history of the vehicle into the road area.

For example, a charging system may be established where a vehicle is charged for its first entry into a road area on a date, and once the vehicle has been charged, the vehicle is not charged no matter how many times the vehicle enters the road area during the date. In such a charging system, a calculation of a guide route avoiding an entry into a road area is insufficient. It is desirable that methods for calculating guide routes are switched in accordance with whether a vehicle has already entered the area.

Additionally, the above conventional technique cannot respond to the case where it is determined whether a vehicle avoids entering a road area in accordance with a past entry history of the vehicle into the road area, in addition to the above charging case.

SUMMARY OF THE INVENTION

In view of the above-described problem, it is an object of the present invention to provide a navigation apparatus.

A navigation apparatus of a vehicle includes: storage means for storing information about the vehicle and a road area; and guide route calculating means for calculating a guide route on the basis of the information stored in the storage means. The apparatus determines whether to avoid an entry into a road area on the basis of the information about the vehicle and the road area.

Alternatively, the navigation apparatus may further include entry permission data rewriting means. The storage means is a storage medium for storing entry permission data of permission for the vehicle to enter a time limit charging road area. Regarding the time limit charging road area, a vehicle is allowable to enter the time limit charging road area during a charging period when a charge of the time limit charging road area is preliminarily paid. The entry permission data rewriting means rewrites a content of the entry permission data in the storage medium into a content that entry of the vehicle into the time limit charging road area during the charging period is permitted when the charge has been paid for the charging period. The guide route calculating means calculates the guide route avoiding the entry of the vehicle into the time limit charging road area in accordance with a content of the entry permission data that no entry of the vehicle into the time limit charging road area is permitted at a current time. The guide route calculating means calculates the guide route without avoiding the entry of the vehicle into the time limit charging road area in accordance with a content of the entry permission data that the entry of the vehicle into the time limit charging road area is permitted at the current time.

The above navigation apparatus determines whether to avoid the entry of the vehicle into the time limit charging road area arranged to permit the entry of the vehicle during a charging period after a charge for the period is paid, in accordance with the payment condition of the time limit charging road area.

Alternatively, the storage means may be a storage medium for storing an entry history of the road area, and the guide route calculating means may calculate the guide route avoiding entry of the vehicle into the road area in accordance with the entry history of the road area.

The above navigation apparatus determines whether to avoid the entry of the vehicle into the road area in calculating the guide route in accordance with the entry history into the road area.

BRIEF DESCRIPTION OF THE DRAWINGS

The above and other objects, features and advantages of the present invention will become more apparent from the following detailed description made with reference to the accompanying drawings. In the drawings:

FIG. 1 is a block diagram showing a hardware structure of a vehicle navigation apparatus according to a first embodiment of the present invention;

FIG. 2 is a table showing part of payment history data, according to the first embodiment;

FIG. 3 is a flowchart showing a program executed by a CPU, according to the first embodiment;

FIG. 16 is a table showing cases of directions for calculating routes, according to the first embodiment;

FIG. 21 is a table showing cases where routes are calculated based on directions, according to the second embodiment.

DETAILED DESCRIPTION OF THE PREFERRED EMBODIMENTS

First Embodiment

Figure 4:
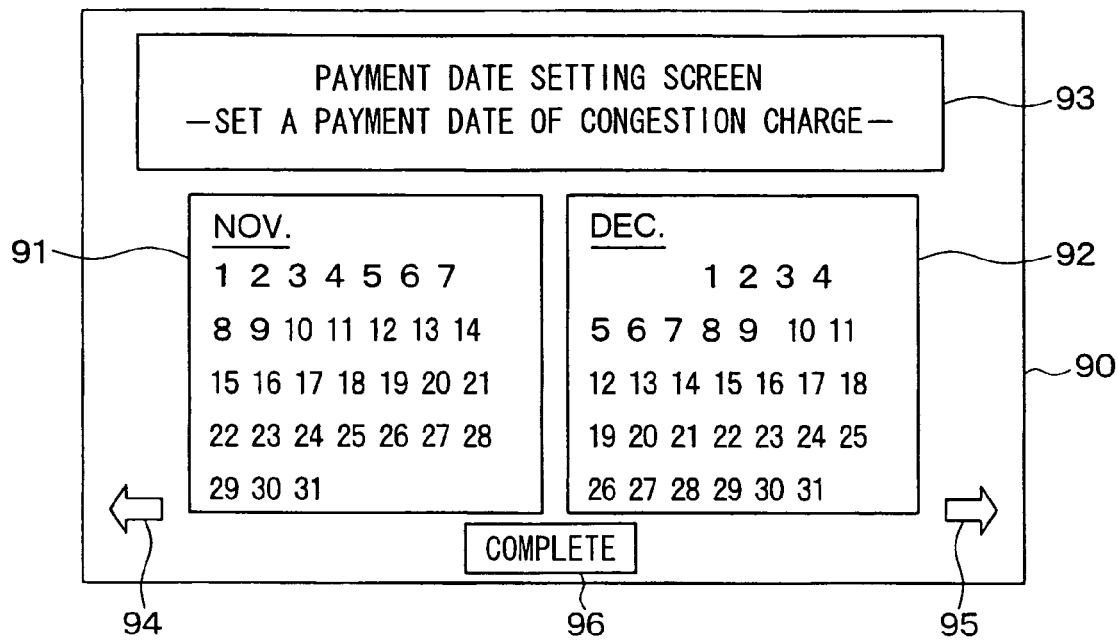
FIG. 4 is a plan view showing a display screen for registration of a payment history data, according to the first embodiment.

One embodiment of the present invention is explained below. In FIG. 1, a hardware structure of a vehicle navigation apparatus 1 of this embodiment is shown.

This vehicle navigation apparatus 1 has a position detector 11, an operation switch group 12, an image display device 13, a speaker 14, a RAM 16, a ROM 17, an outer storage medium 18 as an external memory, and a CPU 19.

The position detector 11 has, e.g., a geomagnetic sensor, a gyroscope, a vehicle speed sensor, and a GPS receiver. These sensors are well known and not shown. In accordance with each characteristic of these sensors, the position detector 11 outputs information for specifying a current position and direction of a vehicle to the CPU 19.

The operation switch group 12 includes input devices such as a plurality of mechanical switches provided to the vehicle navigation apparatus 1 and a touch panel laid on a display surface of the image display device 13. When a user presses the mechanical switches and touches the touch panel, signals are outputted to the CPU 19. Here, the user of the vehicle is, for example, a driver or a passenger of the vehicle.

The image display device 13 displays an image based on an image signal outputted from the CPU 19 to a user. For example, a map where a current position is centered is displayed as the displayed image.

The outer storage medium 18 is a nonvolatile storage medium such as a HDD. The outer storage medium 18 stores, e.g., a program read and executed by the CPU 19, map data for route guide, a plurality of entry permission flags (corresponding to entry permission data in the claims), and a plurality of payment history data pieces.

The map data has road data and facility data. The road data includes positions and types of road strips (links) and intersections (nodes) and information about connection relationships between the intersections and road strips. The facility data includes a plurality of entries of facilities. Each entry includes name information, location information, type information, and the like about a target facility. In this embodiment, the map data includes data about a congestion charging area (corresponding to a time limit charging road area in the claims). The congestion charging area herein includes one or more road strips. When a vehicle enters the area on a certain day, the vehicle needs to pay an entry charge (namely, the congestion charge) for that day. Once the vehicle pays the charge, the vehicle can enter the area any number of times on that day.

In this institution, a person who wants to enter a congestion charging area by use of a vehicle registers the license plate, and pays a charge for the congestion charging area on a desired day. The payment information is notified to the authorities. The authorities monitor and collect license plate information about all the vehicles which enter the congestion charging area. The authorities charge penalties on owners of vehicles having the license plates not stored in the information about the payment for the entry day.

As described above, by paying the charge for the congestion charging area, the vehicle can enter the area during the charging period as often as desired.

More concretely, the data about the congestion charging area is data for specifying road strips included in each congestion charging area.

For the authorities to specifying which vehicle enters the congestion charging area, a camera may be always used to take images of license plates of vehicles traveling on roads through which the vehicles can enter the congestion charging area. In addition, a road communicator installed on an entry point on a road to the congestion charging area and a vehicle communicator in a vehicle may communicate with each other to transmit the unique identification code from the vehicle communicator to the road communicator. The charge may be collected on site or later. Like the ETC (electronic toll collection system), by communicating between the road communicator and vehicle communicator, the charge collection may be achieved.

Each congestion charging area is provided with one entry permission flag. As described later, the entry permission flag is data used for determining whether a user's vehicle avoids entering each congestion charging area. The entry permission flag includes information showing whether a user's vehicle has paid a congestion charge of a target congestion charging area for a current day.

The payment history data is table-formed data. Each congestion charging area is provided with one piece of payment history data. The payment history data includes information showing whether a user's vehicle has paid a congestion charge for current, past, and future days. In FIG. 2, part of the payment history data about a certain congestion charging area is shown. As shown in FIG. 2, the payment history data includes entries for respective dates. Each entry includes a date and information about whether a congestion charge on the vehicle has been paid for the date. A factory default of each entry of the vehicle navigation apparatus 1 shows that a charge is unpaid.

The CPU (corresponding to a computer) 19 reads a program for operating the vehicle navigation apparatus 1 from the ROM 17 and outer storage medium 18, and executes it. In this execution, the CPU 19 reads information from the RAM 16, ROM 17, and outer storage medium 18, writes information on the RAM 16 and outer storage medium 18, and transmits and receives signals to or from the position detector 11, the operation switch group 12, image display device 13, and speaker 14.

Concrete processes thorough the program executed by the CPU 19 are, e.g., a current position specifying process, a guide route calculating process, a route guide process, a menu process, a payment history recording process, and an entry permission flag rewriting process.

The current position specifying process is as follows. In accordance with signals from the position detector 11, by use of a technique such as the well-known map matching, a current position and direction of a vehicle is specified.

The guide route calculating process is as follows. By receiving an input of a destination from a user by use of the operation switch group 12, an optimum guide route from a current position to a destination is calculated.

The route guide process is as follows. Map data is read from the outer storage medium 18. An image made by laying calculated guide route, destination facility, routed facility, current position, and the like on a map of this map data is outputted to the image display device 13. When the guide is required, such as when a user's vehicle arrives in front of a guide intersection, guide voice signals instructing right turn, left turn, and the like is outputted to the speaker 14.

The menu process is as follows. Various processes executed by the CPU 19 are hierarchically displayed as a menu based on their functions and objectives. A program corresponding to a process a user selects from the processes displayed as the menu starts to be executed. The menu is displayed by outputting image data of the menu to the image display device 13. The selection by the user is received by detecting a selecting operation on the switch operation group 12.

The entry permission flag rewriting process is as follows. A content of an entry permission flag is rewritten in accordance with information in the payment history data at a timing at which a date changes and a content of the payment history data changes. This entry permission flag rewriting process is after-mentioned in detail.

The payment history recording process is as follows. A content of the above-described payment history data is changed. In FIG. 3, a program 600 executed by the CPU 19 for this entry history recording process is shown. When a user operates the switch operation group 12 in the above menu to execute this entry history recording process of a specific congestion charging area and the CPU 19 receives the operation, the CPU 19 starts this program 600.

In executing this program 600, the CPU 19 displays a reception image as a standby screen on the image display device 13 in Step 610. In FIG. 4, a display screen 90 is shown. The display screen 90 shows the reception image on the image display device 13. This display screen 90 includes, e.g., a calendar portion 91, a calendar portion 92, a title portion 93, a reverse button 94, a forward button 95, and a completion button 96 as the components. The buttons herein are user-selectable components on the screen. The selection of the buttons by a user is achieved by touching portions corresponding to display areas of the buttons on a touch panel where the switch operation group 12 is laid on the display surface of the image display device 13. The calendar portion 91 and calendar portion 92 show all dates on a specific month in a form of a calendar. Each displayed date forms one button. The title portion 93 includes a message for encouraging an input of a date for which a congestion charge has been paid. Thus, the title portion 93 shows a congestion charge payment date setting screen and the message of "Set a date for which you have paid a congestion charge."

Additionally, in this Step 610, the CPU 19 determines whether the date buttons in the calendar portions 91, 92, the reverse button 94, and the forward button 95 are selected. When the CPU 19 determines that the user has selected the date button, the fact that the date has been selected is recorded on a temporary storage area of the RAM 16. When the press of the reverse button 94 is detected, an image showing that displayed current months of calendars of the calendar portions 91, 92 is changed to months before the current months (for example, two months before), is displayed on the image display device 13. When the press of the completion button 96 is detected, an image showing that displayed current months of calendars of the calendar portions 91, 92 is changed to months after the current months (for example, two months later), is displayed on the image display device 13.

In Step 620, it is determined whether the completion button 96 has been selected. When the completion button 96 has been selected, Step 630 is executed. When the completion button 96 has not been selected, Step 610 is executed again.

In Step 630, in accordance with data of the selected dates stored in the temporary storage area of the RAM 16, contents of the entries corresponding to the dates are changed so that the contents show that a charge has been paid. The entries are included in the payment history data of the congestion charging area selected by the user when this program 600 starts. After Step 630, the program 600 ends.

The CPU 19 executes such a program 600, so that the vehicle navigation apparatus 1 displays an input image in a form of a calendar. The vehicle navigation apparatus 1 receives the date selecting operation by a user who uses the input image (see Step 610). The contents of the entries corresponding to the received dates are changed so that the contents show that the tax has been paid (see Step 630). The entries are included in the payment history data of the congestion charging area specified by the user. Accordingly, the user properly selects the reverse button 94 or the forward button 95 on the display screen 90 to display a month including button dates on the calendar portion 91 or the calendar portion 92. The user selects one or more button dates. After the selection, the user selects the completion button 96, so that a payment history can be registered to each payment history data.

The CPU 19 further may receive selection of dates by the user by use of the input image in a form of a calendar, and an operation for canceling the payment by use of the operation device. A content of an entry corresponding to the received date, the entry being included in the payment history data, may be changed so that the content shows that a charge is unpaid.

Figure 5:
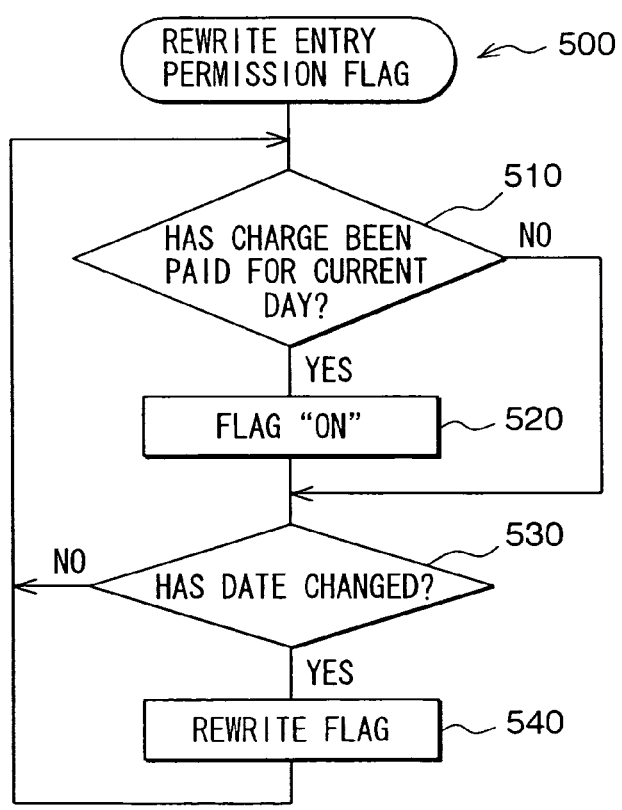
FIG. 5 is a flowchart showing a program executed by the CPU, according to the first embodiment.

Next, the entry permission flag rewriting process is explained. In FIG. 5, a flowchart of a program 500 executed by the CPU 19 to achieve this entry permission flag rewriting process is shown. Immediately after the activation, the CPU 19 executes this program 500. In Step 510, after the last execution of Step 510, the CPU 19 determines whether an unpaid state has changed to a paid state in an entry of a current date in any payment history data. When there is the change, the CPU 19 executes Step 520. When there is no change, the CPU 19 executes Step 530.

In Step 520, a value of an entry permission flag targeting a congestion charging area corresponding to the payment history data in which the entry has changed is turned on (namely, a value showing that an entry is permitted). Then, the CPU 19 executes Step 530.

In Step 530, after the last execution of Step 530, the CPU 19 determines whether a date has changed, namely, whether the time has exceeded 0 a.m. Here, 0 a.m. means twelve midnight. When the date has changed, the CPU 19 executes Step 540. When the date has not changed, the CPU 19 executes Step 510.

In Step 540, the CPU 19 rewrites each entry permission flag. Concretely, the CPU 19 executes the following (1) and (2).

(1) When, in a payment history data, a content of an entry of a date beginning from the current time show that a charge has been paid, an entry permission flag of a congestion charging area corresponding to the payment history data is turned on (namely, a value showing that an entry is permitted).

(2) When, in a payment history data, a content of an entry of a date beginning from the current time show that no charge has been paid, an entry permission flag of a congestion charging area corresponding to the payment history data is turned off (namely, a value showing that no entry is permitted).

Step 510 is executed following Step 540.

The CPU 19 repeatedly executes Steps 510 to 540. Accordingly, when an entry of the current day in the payment history data of a congestion charging area changes, namely when a user inputs the fact that a charge for the congestion charging area on the current day has been paid, the vehicle navigation apparatus 1 sets an entry permission flag of the congestion charging area to "on" (see Steps 510, 520), and rewrites a value of each entry permission flag in accordance with the corresponding payment history data at a change of a date as a periodical partition timing.

Next, the guide route calculating process executed by the CPU 19 is explained in detail. In this the guide route calculating process, the CPU 19 of this embodiment determines whether to calculate a route avoiding entering a congestion charging area or a route not allowing for the avoidance of an entry into a congestion charging area, in accordance with, e.g., an entry permission flag corresponding to the congestion charging area.

Figure 6:
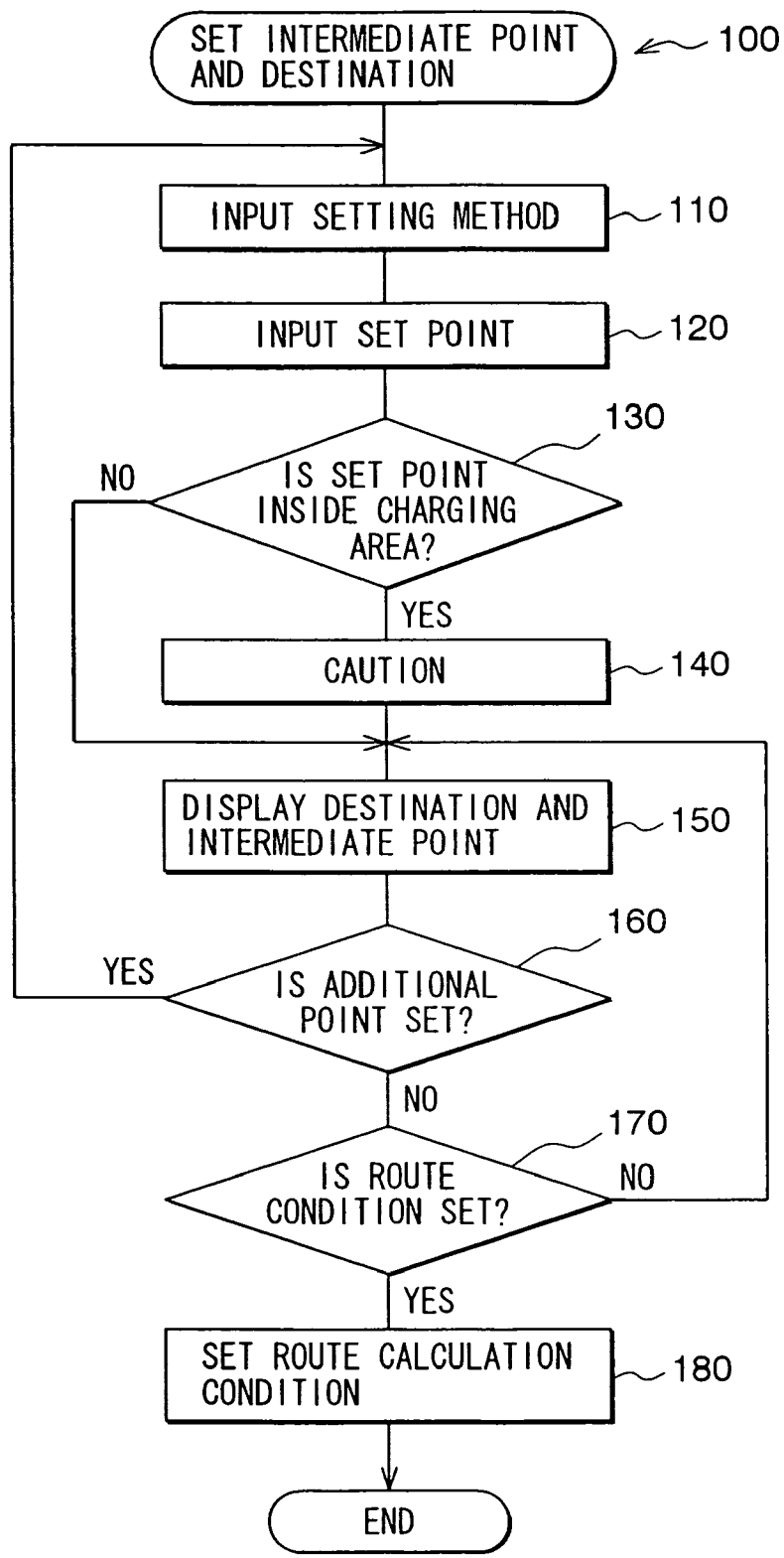
FIG. 6 is a flowchart showing a program executed by the CPU, according to the first embodiment.
Figure 7:
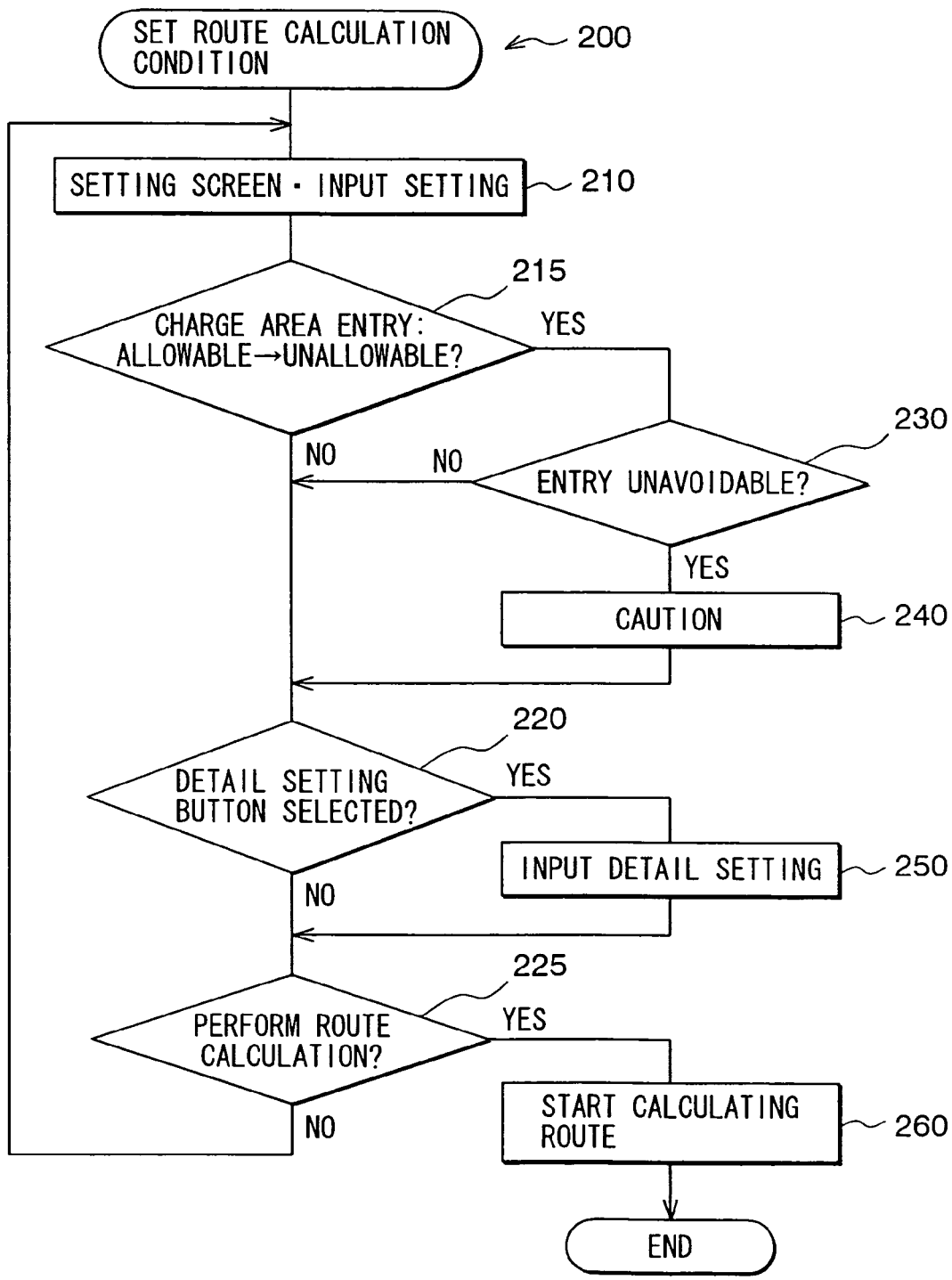
FIG. 7 is a flowchart showing a program executed by the CPU, according to the first embodiment 19.

In FIGS. 6, 7, programs 100, 200 executed by the CPU 19 for this guide route calculating process are shown.

When a user executes an operation so that intermediate points and a destination are set in the above menu process, the CPU 19 starts the program 100. When a user executes an operation so that a route calculating condition is set in the above menu process, the CPU 19 starts the program 200.

Figure 8:
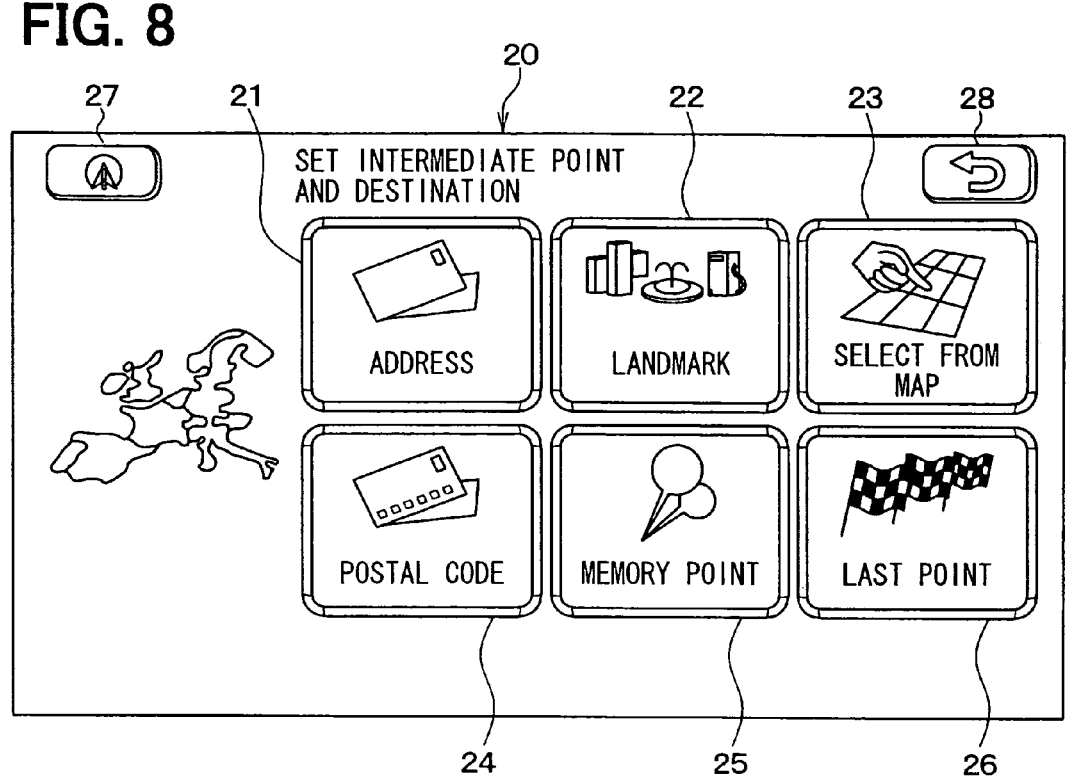
FIG. 8 is a plan view showing a display screen for selection of setting means for a destination and intermediate points, according to the first embodiment.

When starting the program 100, the CPU 19 first receives a selection of a method for setting intermediate points and a destination. Concretely, a display screen as shown in FIG. 8 is displayed on the image display device 13. The CPU 19 waits a user to select a method for setting intermediate points and a destination with a display screen 20 operated by a user. When the CPU 19 receives the selection, the CPU 19 executes Step 120.

The display screen 20 of FIG. 8 is explained. The display screen 20 includes a plurality of components such as an address selecting button 21, a landmark selecting button 22, a map selecting button 23, a postal code selecting button 24, a memory point selecting button 25, a last point selecting button 26, a current point display button 27, and a return button 28. When the CPU 19 detects a touch on a portion corresponding to a specific button, the CPU 19 determines that a user has selected the button. Then, the CPU 19 executes the process corresponding to the button. Here, the button herein is a component in the screen. The component can be selected by a user. The selection of the button by the user is achieved by touching a portion corresponding to a display area of the button of the touch panel of the operation switch group 12 laid on the display screen of the image display device 13.

Concretely, when one of the address selecting button 21, the landmark selecting button 22, the map selecting button 23, the postal code selecting button 24, the memory point selecting button 25, and the last point selecting button 26 is selected, the CPU 19 determines that a method for setting intermediate points and a destination has been selected. Then, the CPU 19 executes Step 120. When the current point display button 27 is selected, the CPU 19 stops the program 100, and displays a map where a current position is centered, on the image display device 13. When the return button 28 is selected, the CPU 19 stops the execution of the program 100, and restarts the menu process. A current position display button 27 and a return button 28 on the after-mentioned other display screen are also button for achieving the same functions as the current position display button 27 and the return button 28 on this display screen. Step S110 is a standby screen of receiving selection of setting method, i.e., a standby screen of inputting a setting method. Step S120 is a standby screen of receiving point setting, i.e., a standby screen of inputting set point.

In Step 120, the CPU 19 receives a point setting. Concretely, when the address selecting button 21 is selected in Step 110, the CPU 19 receives a character string of an address inputted by a user. The CPU 19 specifies a destination or an intermediate point from the received address. When the landmark selecting button 22 is selected in Step 110, the CPU 19 displays a list of landmarks, and receives a selection of one of the landmarks by a user. Then, the CPU 19 specifies the received landmark as a destination or an intermediate point. When the map selecting button 23 is selected in Step 110, the CPU 19 displays a map. The CPU 19 receives a selection of one point on the map, and specifies the point as a destination or an intermediate point. When the postal code selecting button 24 is selected in Step 110, the CPU 19 receives an input of a postal code. The CPU 19 specifies an area corresponding to the received postal code or a position selected in detail from the area, as a destination or an intermediate point. When the memory point selecting button 25 is selected in Step 110, the CPU 19 displays a list of specific points (for example, a home, a parking area, and a favorite restaurant) previously registered by a user. The user selects one of the points. The CPU 19 receives the selection, and specifies the received point as a destination or an intermediate point. When the last point selecting button 26 is selected in Step 110, the CPU 19 specifies a last selected destination as a destination or intermediate point of this time.

Figure 9:
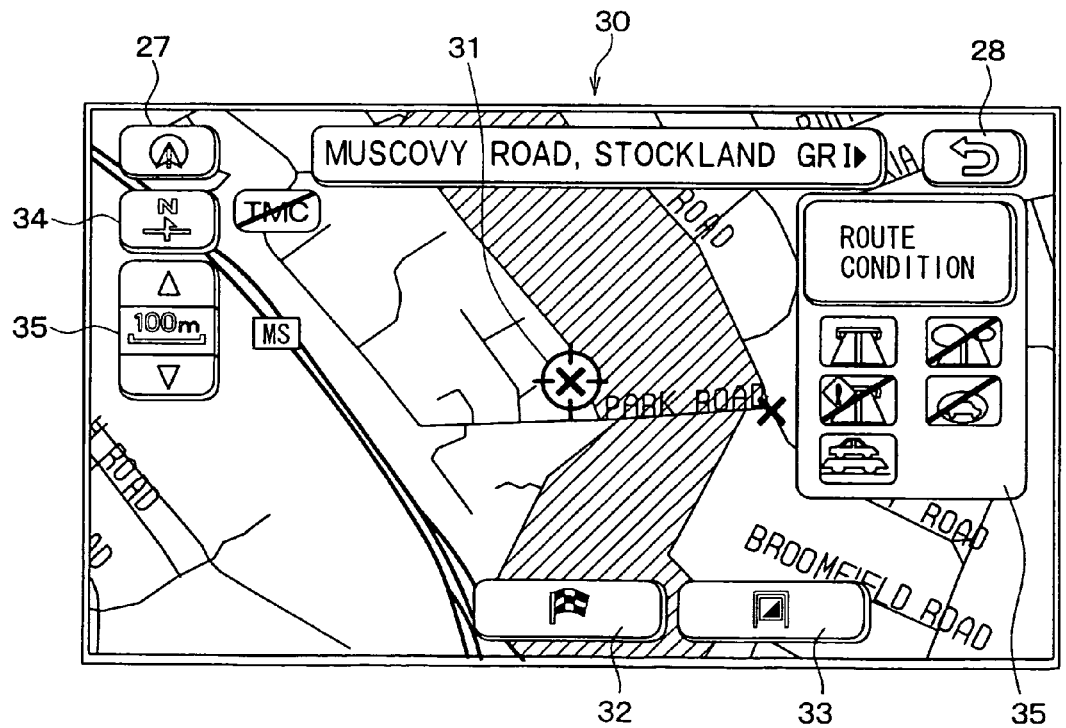
FIG. 9 is a plan view showing a map display screen of a destination and intermediate points according to the first embodiment.

In FIG. 9, as one example of the reception of this point setting, a map display screen 30 is shown. The map display screen 30 is displayed on the image display device 13 by the CPU 19 when the map selecting button 23 is selected in Step 110. In the display screen 30, a selected position mark 31, a destination button 32, an intermediate point button 33, a direction icon 34 for showing a direction of the map, a scale changing button 35, the current position display button 27, the return button 28, and the like are laid over the map. When a user selects the destination button 32, the CPU 19 specifies a point laid over the selected point mark 31 on the map, as a destination. When a user selects the intermediate point button 33, the CPU 19 specifies a point laid over selected point mark 31 on the map, as an intermediate point. When the CPU 19 detects a selection of the scale changing button 35, the CPU 19 expands and reduces a scale of the displayed map. In accordance with an operation of the switch operation group 12 by a user, the CPU 19 moves the selected position mark 31 on the map.

Next in Step 130, the CPU 19 determines whether a set point (a destination or an intermediate point) specified in Step 120 is within any one of congestion charging areas, in accordance with the map data. When the set point is within a congestion charging area, the CPU 19 executes Step 140. When the set point is outside a congestion charging area, the CPU 19 executes Step 150.

Figure 10:
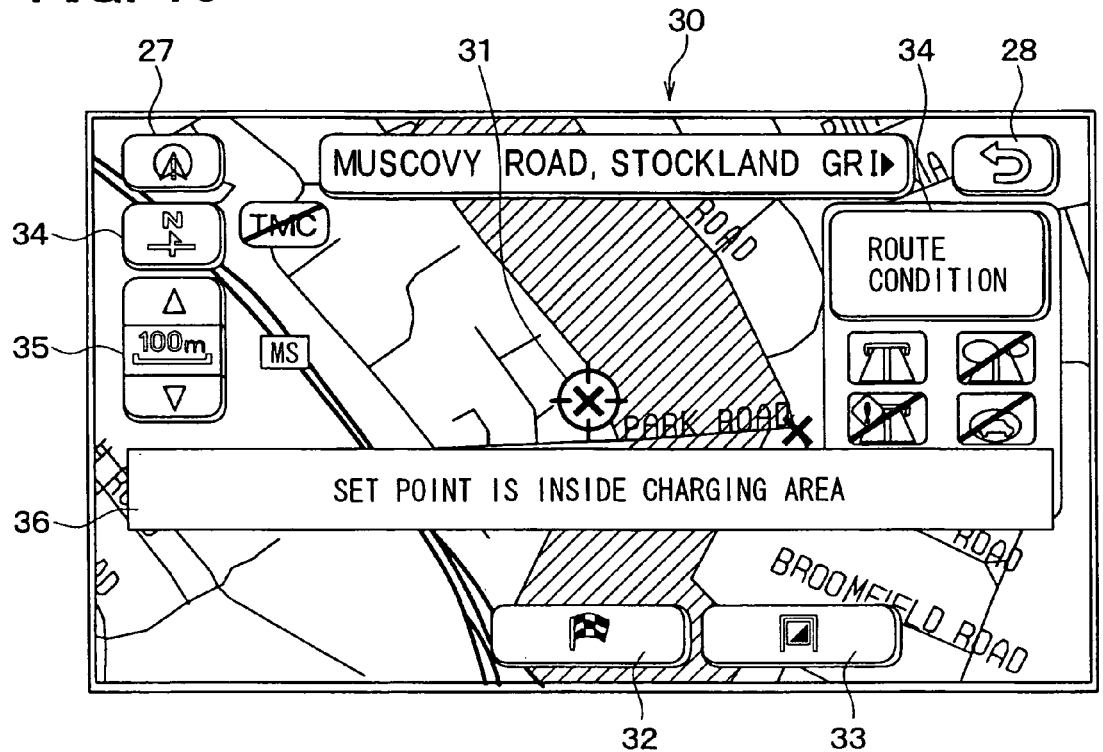
FIG. 10 is a plan view showing the display screen having a warning display on a popup window, according to the first embodiment.

In Step 140, the CPU 19 makes the image display device 13 or speaker 14 execute a warning notification as a caution for a user that a set point is within a congestion charging area during a predetermined time or until a user operates the operation switch group 12 to show the understanding of the warning and the CPU 19 receives this operation. One example of the display screen 30 for such a warning is shown in FIG. 10. In FIG. 10, a warning display of "The set point is within a congestion charging area." is displayed in a popup window 36 in the center of the display screen 30. Only when the aftermentioned program 200 is executed to make a setting for avoiding entering a congestion charging area is to be avoided, this warning notification may be made. Only when an entry permission flag corresponding to this congestion charging area is off, this warning notification may be made. After Step 140, the CPU 19 executes Step 150.

Figure 11:
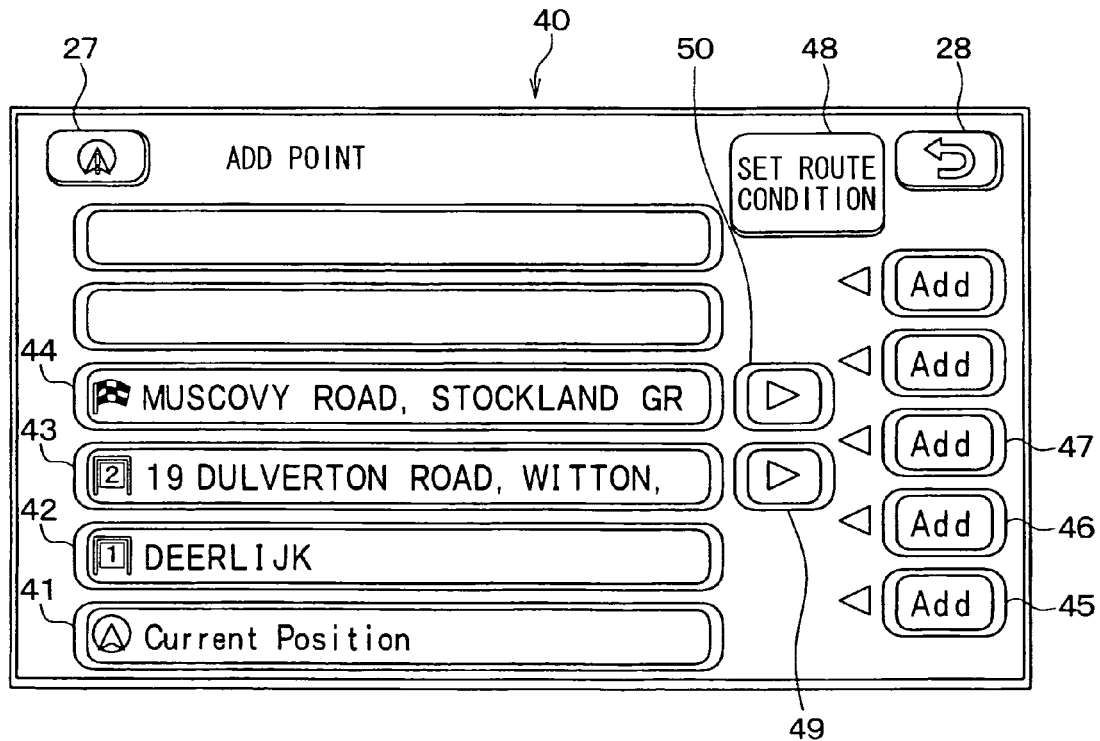
FIG. 11 is a plan view showing a display screen of a destination and intermediate points, according to the first embodiment.

In Step 150, a list of destinations and intermediate points specified after the start of the execution of the program 100 is shown. In FIG. 11, a display screen 40 showing one example of this list is shown. This display screen 40 includes components such as a specified current position name 41, specified intermediate point names 42, 43, a specified destination name 44, point adding buttons 45 to 47, a route condition setting button 48, scroll buttons 49, 50, the current point display button 27, and the return button 28. In Step 150, when the scroll buttons 49, 50 are selected, name displays of the intermediate point name 43 and destination name 44 are scrolled laterally.

After Step 150, in Step 160, the CPU 19 determines whether an operation for adding a point, namely, a selection of any one of the point adding buttons 45 to 47, is executed. In accordance with which is selected from the buttons 45 to 47, the routing order of points selected by use of the buttons is determined. When there is an operation for adding a point, the CPU 19 executes Step 110. When there is no operation, the CPU 19 executes Step 170.

In Step 170, the CPU 19 determines whether there is an operation for setting a route condition, namely, the route condition setting button 48 is selected. When there is the operation, the CPU 19 executes Step 180. When there is no operation, the CPU 19 executes Step 150.

In Step 180, to set a route calculating condition, the program 200 starts. Specifically, Step S180 performs to start setting the route calculation condition together with starting Step S200. After that, the program 100 ends. Thus, the program 200 starts except in the menu process, and under execution of this program 100.

The CPU 19 executes such a program 100, so that the vehicle navigation apparatus 1 receives a setting of a point such as a destination and intermediate points (see Step 120). When the set point is within a congestion charging area, the vehicle navigation apparatus 1 notifies a user about a warning notification that the set point is within a congestion charging area (see Step 140).

Figure 12:
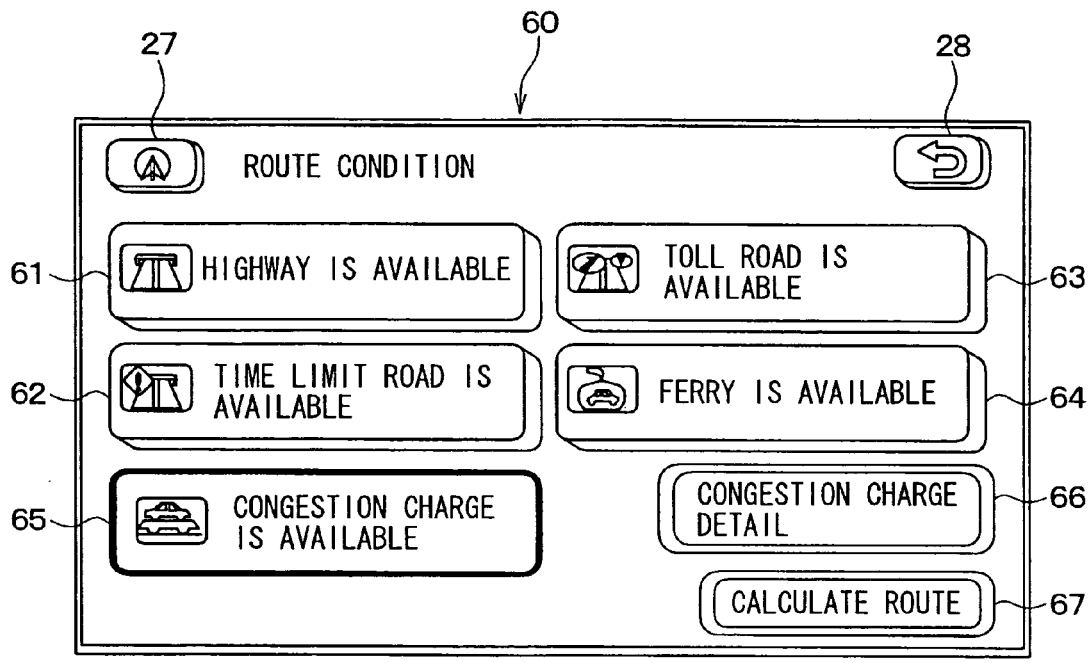
FIG. 12 is a plan view showing a display screen for setting route conditions, according to the first embodiment.

When the CPU 19 starts the program 200, the CPU 19 processes a display for making a user set various conditions used in calculating a route, and receives the setting, in Step 210. Specifically, Step S210 performs to display the setting screen, and to display the screen of inputting setting. In this time, a display screen 60 displayed on the image display apparatus 13 is shown in FIG. 12. The display screen 60 includes components such as a highway possible button 61, a time limit road possible button 62, a toll road possible button 63, a ferry possible button 64, a congestion charge possible button 65, a congestion charge detail setting button 66, and a route calculating button 67. In Step 210, the CPU 19 determines whether any one of the highway possible button 61, the time limit road possible button 62, the toll road possible button 63, the ferry possible button 64, and the congestion charge possible button 65 is selected. When there is the selection, a setting flag corresponding to the selected button is toggled on and off.

In accordance with whether the current corresponding setting flag is on or off, display shapes of the buttons 61 to 65 are different. Concretely, when a certain setting flag corresponding to one of the buttons 61 to 65 is on, a shape of the button is like a pressed mechanical button. When a certain setting flag corresponding to one of the buttons 61 to 65 is off, a shape of the button is like a not-pressed mechanical button.

In Step 215, it is determined whether a setting that an entry into a congestion charging area is possible is changed to a setting that an entry into a congestion charging area is impossible, namely, whether the congestion charge possible button 65 is selected to change a setting flag corresponding to this button from on to off. Specifically, Step S215 performs to decide whether the entry into the congestion charging area is changed from "possible" to "impossible," i.e., whether the charge area entry is changed from "allowable" to "unallowable." When the setting is not changed, Step 220 is executed. When the setting is changed, Step 230 is executed.

In Step 230, it is determined whether an entry into any one of congestion charging area is unavoidable. The case where an entry into a congestion charging area is determined to be unavoidable is as follows. In a point group including a current position, a destination, and intermediate points, at least one of combinations of two points (for example, in the example of FIG. 11, a combination of a current position and DEERLIJK, a combination of DEERLIJ and 19 DULVERTON ROAD, and a combination of 19 DULVERTON ROAD and a destination, MUSCOVY ROAD) which are set in the sequential arrival order is such that one point in the earlier arrival order is outside the congestion charging area and the other point in the later arrival order is inside the congestion charging area. In this case, an entry into a congestion charging area is almost unavoidable. The case where an entry into a congestion charging area is unavoidable when no intermediate point is set and only a destination is set, is as follows. The current position is outside the congestion charging area, and the destination is inside the congestion charging area. It may be determined whether an entry into any one of congestion charging areas corresponding to the entry permission flags which are turned off is unavoidable. When unavoidable, Step 240 is executed. When avoidable, Step 220 is executed.

Figure 13:
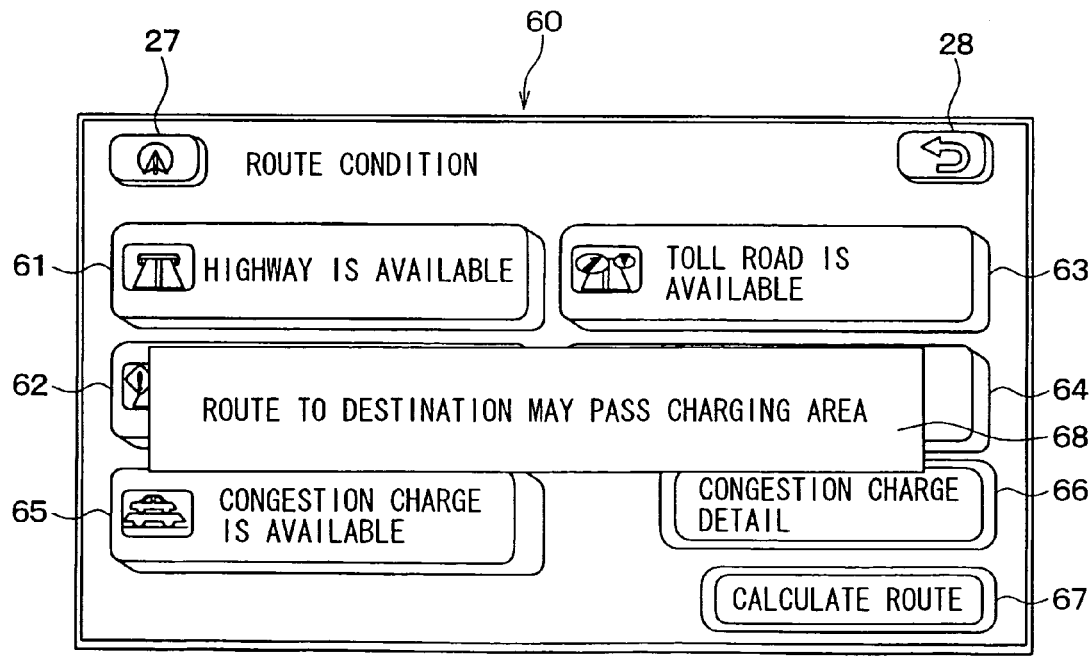
FIG. 13 is a plan view showing the display screen having a warning display on the popup window, according to the first embodiment.

In Step 240, the image display apparatus 13 or the speaker 14 are made to make a warning notification that a guide route entering a congestion charging area is under calculation during a predetermined time or until a user operates the operation switch group 12 to show the understanding of the warning and the CPU 19 receives this operation. One example of a display screen 60 of such a warning is shown in FIG. 13. In FIG. 13, a warning display "The route to the set point may enter a congestion charging area" or "ROUTE TO DESTINATION MAY PASS CHARGING AREA" is displayed in a popup window 68 in the center of the display screen 60. After Step 240, Step 220 is executed.

In Step 220, it is determined whether the congestion charge detail setting button 66 is selected. When selected, Step 250 is executed. When not selected, Step 225 is executed.

Figure 14:
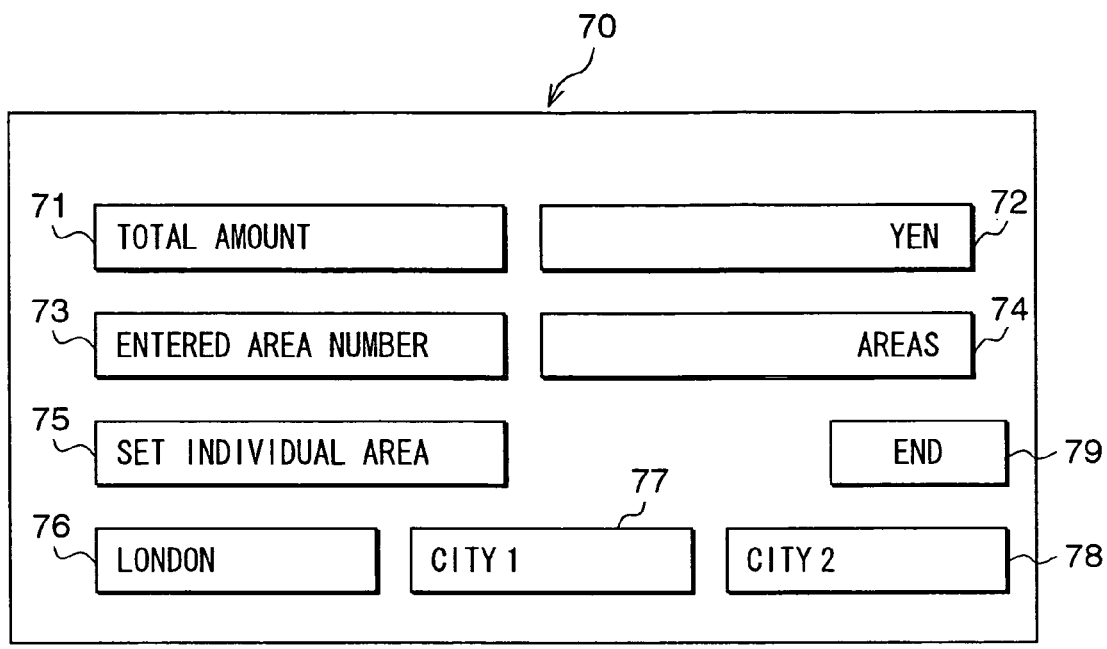
FIG. 14 is a plan view showing a display screen for setting congestion charge detail conditions, according to the first embodiment.

In Step 250, a screen for a detail setting is displayed, and a user is made to make a detail setting about an entry into a congestion charging area by use of this screen display. In FIG. 14, one example of a display screen 70 for a detail setting is shown. The display screen 70 includes a total amount button 71, a amount input field 72, an entered area number button 73, a number input field, an individual area setting button 75, a London button 76, a city A button 77, a city B button 78, and an end button 79.

Only one of the total amount button 71, the entered area number button 73, and the individual area setting button 75 is highlighted. Concretely, when any one of the buttons 71, 73, 75 is selected, the selected button is highlighted. When a different button is highlighted, the other buttons are not highlighted, but normally displayed. The highlight selection information about which one of the buttons 71, 73, and 75 is highlighted is recorded in the outer storage medium 18.

A user can input numbers in the amount input field 72 by use of the switch operation group 12. When the CPU 19 receives an input of a numeric value, the CPU 19 records the value in the outer storage medium 18 as a variable of a total charge. A user can input numbers in the number input field 74 by use of the switch operation group 12. When the CPU 19 receives an input of a numeric value, the CPU 19 records the value in the outer storage medium 18 as a variable of the number of areas to be entered.

The London button 76, a city A button 77, and a city B button 78 are assigned to individual congestion charging areas. By selecting each button, a value of an individual area flag about whether to avoid an entry into the corresponding congestion charging area is toggled on or off.

When the end button 79 is selected, Step 250 ends. Then, Step 225 is executed.

In Step 225, it is determined whether the route calculation button 67 is selected. When selected, Step 260 is executed. When not selected, Step 210 is executed.

In Step 260, the route calculating process starts, and the program 200 ends.

The CPU 19 executes such a program 200, so that the vehicle navigation apparatus 1 receives an input of a route calculating condition from a user (see Step 210). When an entry from outside a congestion charging area into the congestion charging area is almost unavoidable although a user makes a setting for avoiding an entry into the congestion charging area (see Step 215), the vehicle navigation apparatus 1 makes a notification that a guide route not allowing for the avoidance of the entry into the congestion charging area is calculated to the user (see Steps 230, 240). Accordingly, the user can receive less uncomfortable feeling. For example, the reason that the entry is almost unavoidable is that, in point group including a current position, a destination, and intermediate points, at least one of combinations of two points which are set in the sequential arrival order is such that one point in the earlier arrival order is outside the congestion charging area and the other point in the later arrival order is inside the congestion charging area. The user recognizes such a display, and is urged to determine whether to reset intermediate points and destination so that an entry into a congestion charging area is avoidable or to pay a congestion charge for the congestion charging area on a current day.

In the detail setting about a plurality of congestion charging areas, the vehicle navigation apparatus 1 can make the following settings (see Step 250). Entries into the upper limit number of congestion charging areas are permitted, and entries into other congestion charging areas are avoided. Entries into the congestion charging areas whose total charge is under an upper limit amount are permitted, and entries into other congestion charging areas are avoided. Each congestion charging area is permitted or not permitted.

Next, the guide route calculating process executed by the CPU 19 is explained in detail. The CPU 19 executes a program 300 shown in FIG. 15 for the guide route calculating process. When the CPU 19 starts the program 300, the CPU 19 first references route calculating conditions in Step 310. The referenced and read route calculating conditions are, e.g., entry permission flags recorded thorough the program 100, setting flags which are set in Step 210 of the program 200, and congestion charging area detail settings which are set in Step 250 (namely, highlight selection information, charges inputted in the amount input field 72, the number inputted in the entered area number button 73, and individual area flags).

In Step 320, a route is calculated in accordance with the referenced route calculating conditions.

Concretely, an optimum route for each section divided by a point group including a current position (starting position), a destination, and intermediate points is calculated in accordance with the Dijkstra method. In this calculation, costs of a plurality of routes connecting between a starting point and an end point are calculated. The route of the lowest cost is specified as an optimum route. When a route enters a congestion charging area, a value of a cost of this route changes in accordance with a value of a setting flag.

Concretely, when a setting flag corresponding to the highway possible button 61 is off, a cost of a route passing through a highway is so high that this route cannot be actually an optimum route. When the setting flag is on, a cost of a route passing through a highway is lower than the cost when the setting flag is off so that the route passing through the highway can be actually an optimum route.

When a setting flag corresponding to the time limit road possible button 62 is off, a cost of a route passing through a time limit road is so high that this route cannot be actually an optimum route. When the setting flag is on, a cost of a route passing through a time limit road is lower than the cost when the setting flag is off so that the route passing through the time limit road can be actually an optimum route.

When a setting flag corresponding to the toll road possible button 63 is off, a cost of a route passing through a toll road is so high that this route cannot be actually an optimum route. When the setting flag is on, a cost of a route passing through a toll road is lower than the cost when the setting flag is off so that the route passing through the toll road can be actually an optimum route.

When a setting flag corresponding to the ferry possible button 64 is off, a cost of a route using a ferry is so high that this route cannot be actually an optimum route. When the setting flag is on, a cost of a route using a ferry is lower than the cost when the setting flag is off so that the route using the ferry can be actually an optimum route.

When a setting flag corresponding to the congestion charge possible button 65 is on, a cost of a route entering a congestion charging area is such a value that the route entering the congestion charging area can be actually an optimum route. Namely, a cost is calculated without allowing for avoidance of an entry into the congestion charging area.

The case in which the setting flag corresponding to the congestion charge possible button 65 is off is explained below. In this case, when a route is to enter a congestion charging area, a value of a cost of the route changes in accordance with an entry permission flag corresponding to the congestion charging area. The case where an entry permission flag corresponding to the congestion charging area is on and the case the entry permission flag is off are explained below.

(1) The Case where the Entry Permission Flag is on:

In this case, a cost of a route entering the congestion charging area is such a value that this route can be an optimum route. Namely, the cost is calculated without allowing for the avoidance of the entry into the congestion charging area.

(2) The Case where the Entry Permission Flag is Off:

In this case, when a starting point of at least one of all sections is outside the congestion charging area and an end point of the section is inside the congestion charging area, a cost for each section is calculated without allowing for the avoidance of the entry into the congestion charging area. The reason for this calculation is as follows. When at least one of combinations of two points which are set in the sequential arrival order in a point group including a current position, a destination, and intermediate points is such that one point in the earlier arrival order is outside the congestion charging area and the other point in the later arrival order is inside the congestion charging area, a user's vehicle enters the congestion charging area at least once unless an extreme rare condition occurs. Therefore, it is almost meaningless that a route which avoids entering the congestion charging area is calculated.

In this case, in all the sections, when a starting point of the section is within the congestion charging area or an end point of the section is outside the congestion charging area, a method for the route calculation changes in accordance with the highlight selection information which is set in Step 250 of the program 200, as described below.

(2-1) When the Highlight Selection Information Shows that any of the Total Amount Button 71, the Entered Area Number Button 73, and the Individual Area Setting Button 75 are not Highlighted:

In this case, a route avoiding an entry into the congestion charging area is calculated. As a cost calculation for avoiding an entry into the congestion charging area, a cost of a route entering the congestion charging area is not under a cost of a route not entering the congestion charging area. Even in this case, when all candidate routes enter the congestion charging area, one of the routes is calculated as an optimum route.

(2-2) When the Highlight Selection Information Shows that the Total Amount Button 71 is Highlighted:

In this case, as long as the total charge is within an amount inputted in the amount input field 72, an entry into the congestion charging area (where the entry permission flag is off) is permitted. Concretely, when a candidate guide route enters one or more congestion charging areas, charges of the congestion charging areas are specified. When the total charge is under the amount inputted in the amount input field 72, a cost of this route is such a value that the route can be an optimum route against a route not entering the congestion charging area. When the total charge is over the amount inputted in the amount input field 72, a cost of this route is such a large value that the route cannot be actually an optimum route against a route not entering the congestion charging area.

The information about a charge of each congestion charging area is previously stored in the outer storage medium 18. The CPU 19 reads this information to specify a charge of each congestion charging area.

As described above, the CPU 19 calculates the following guide route. The guide route does not allow for the avoidance of the entries into a plurality of the congestion charging areas in which a charge amount for an entry is determined and whose total charge amount is not over the upper limit amount (namely, the amount inputted in the amount input field 72), but avoids the entries into the other congestion charging areas. Accordingly, in accordance with the upper limit amount, a plurality of the congestion charging areas are divided into the areas where an entry is avoided and the areas where an entry is not avoided.

(2-3) When the Highlight Selection Information Shows that the Entered Area Number Button 73 is Highlighted:

In this case, when the number of the entered congestion charging areas (where the entry permission flag is zero) is within the number inputted in the number input field 74, entries into the congestion charging areas are permitted. Concretely, when candidate route enters one or more congestion charging areas, and the number of the congestion charging areas is equal to or under the number inputted in the number input field 74, a cost of this route is such a value that this route can be an optimum route against a route not entering the congestion charging areas. When the number of the congestion charging areas is over the number inputted in the number input field 74, a cost of this route is such a large value that this route cannot be an optimum route against a route not entering the congestion charging areas.

As described above, the CPU 19 calculates a guide route not allowing for the avoidance of the entries into the upper limit number of the congestion charging areas but avoiding the entries into the other congestion charging areas. Accordingly, the congestion charging areas can be divided into the areas where entries are avoided and the areas where entries are not avoided, in accordance with a limit of the upper limit number.

(2-4) When the Highlight Selection Information Shows that the Individual Area Setting Button 75 is Highlighted:

In this case, the CPU 19 calculates a route not allowing for the avoidance of the entries into the congestion charging areas where the entry permission flag is off and the individual area flag is on. The CPU 19 calculates a route avoiding the entries into the congestion charging areas where the entry permission flag is off and the individual area flag is off. Concretely, when a candidate route is to enter the congestion charging area where the entry permission flag is off and the individual area flag is off at least once, a cost of the route is so large that the route cannot be actually an optimum route against a route not entering the congestion charging area. When a candidate route is to enter only the congestion charging area where the individual area flag is on, a cost of the route is such a value that the route can be an optimum route against a route not entering the congestion charging area.

In FIG. 16, one example of the guide route calculation is shown in a form of a table. The CPU 19 executes this exampled calculation when a destination is set, intermediate points are not set, a setting flag corresponding to the congestion charge possible button 65 is off, and the highlight selection shows that any of the total amount button 71, the entered area number button 73, and the individual setting button 75 are not highlighted. As shown in FIG. 16, the CPU 19 calculates a guide route not allowing for the entry into the congestion charging area where a congestion charge has been paid for a current day, namely, the corresponding entry permission flag is on, regardless of a stating point (current position) and a destination.

The CPU 19 calculates a guide route avoiding an entry into the congestion charging area where a congestion charge has not been paid for a current day, namely, the corresponding entry permission flag is off, when a current position is outside the congestion charging area and a destination is outside the congestion charging area, when a current position is inside the congestion charging area and a destination is outside the congestion charging area, and when a current position is inside the congestion charging area and a destination is inside the congestion charging area.

Accordingly, a guide route from a point outside the congestion charging area to a point outside the congestion charging area can be prevented from entering the congestion charging area once. A route from a point inside the congestion charging area to a point outside the congestion charging area can be prevented from entering the congestion charging area after going out of the congestion charging area once. A route from a point inside the congestion charging area to a point outside the congestion charging area can be prevented from entering the congestion charging area after going out of the congestion charging area once. This is effective when the congestion charging area has a distorted geographic shape.

The CPU 19 may calculate a guide route not allowing for the avoidance of the entry into the congestion charging area where a congestion charge is unpaid for a current day, namely, the corresponding entry permission flag is off, when a current position is outside the congestion charging area and a destination is inside the congestion charging area. When a current position is outside the congestion charging area and a set destination is inside the congestion charging area, a user's vehicle enters the congestion charging area at least once unless a very rare condition occurs. Therefore, it is almost meaningless to calculate a route avoiding an entry into the congestion charging area.

After Step 320, in Step 340, it is determined whether the calculated route is to enter any one of the congestion charging areas. When the route is to enter the congestion charging area, Step 348 is executed. When the route is not to enter the congestion charging area, Step 345 is executed.

Figure 17:
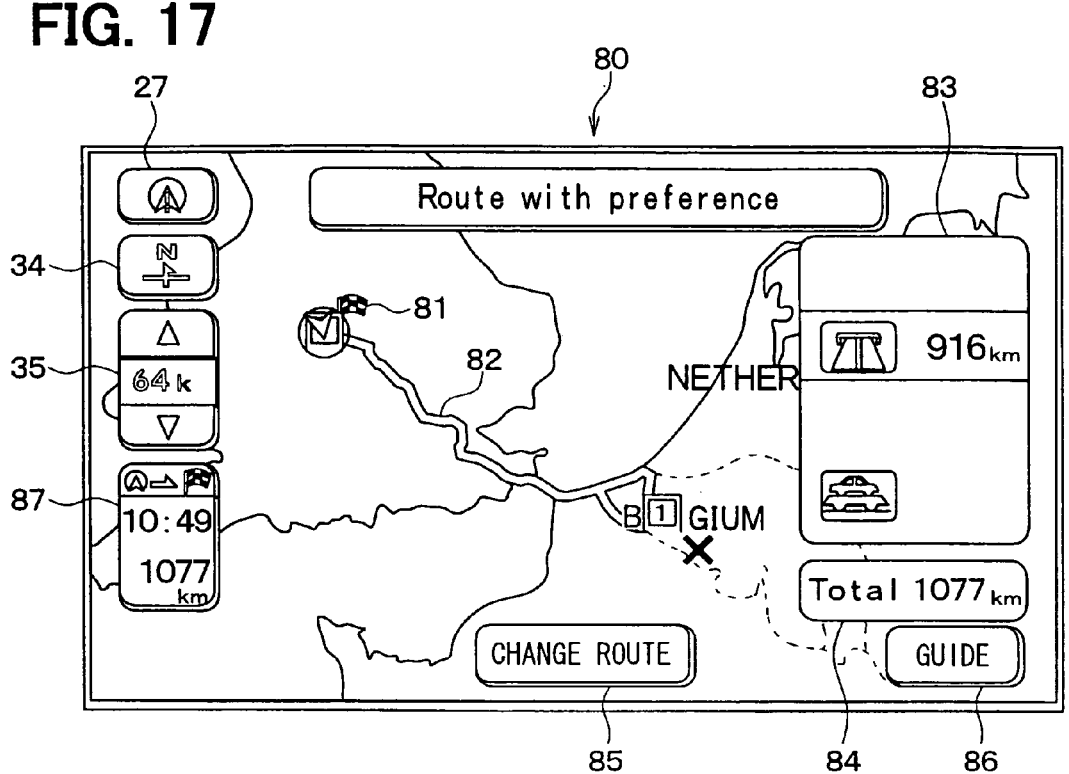
FIG. 17 is a plan view showing a display screen of a calculated guide route, according to the first embodiment.

In Step 345, the calculated optimum guide route is displayed on the image display device 13 with a map. In FIG. 17, one example of a display screen 80 for displaying the guide route is shown. The display screen 80 shows a guide route 82 to a destination 81 on a map. In the display screen 80, a course list 83 shows distances of expressways and general roads in the guide route, a total distance display 84 shows a total course distance of the guide route 82, and an estimated arrival time display 87 shows an estimated arrival time. When a user selects a route changing button 85, the CPU 19 calculates another optimum route. When a user selects a guide button 86, the CPU 19 starts the above-route guide process. After Step 345, the program 300 ends.

In Step 348, it is determined whether a setting shows that an entry into a congestion charging area is impossible, namely, whether the setting flag corresponding to the congestion charge possible button 65 is off. Specifically, Step S348 performs to decide whether the setting of the entry into the congestion charging area is "unallowable." When the entry is impossible, Step 350 is executed. When the entry is not impossible, Step 345 is executed.

In Step 350, the relationship between progress and time of a traveling of a user's vehicle when the vehicle starts traveling on the guide route at a current time (or a starting time specified by a user by use of the operation switch group 12) is specified in accordance with average speeds, speed limits, and the like in road strips of the guide route previously recorded on the map data. In accordance with the relationship, it is determined whether, in the congestion charging areas to be entered, there is at least one congestion charging area whose entry permission flag is reset from on to off before the vehicle enters the congestion charging area because a date changes during the traveling over time. When there is the congestion charging area, Step 380 is executed. When there is no congestion charging area, the same guide route display as in Step 345 is made in Step 355.

Figure 18:
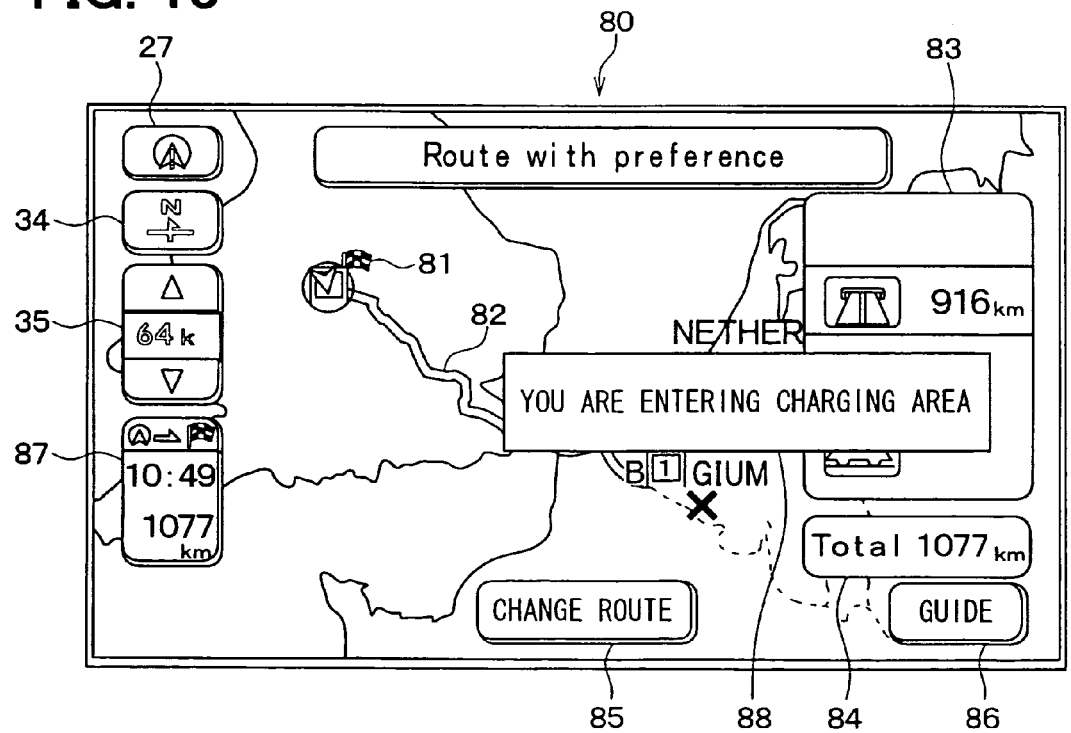
FIG. 18 is a plan view showing the display screen having a warning display on a popup window, according to the first embodiment.

After Step 355, in Step 370, the image display device 13 and the speaker 14 are made to make a notification that a guide route entering a congestion charging area has been calculated (for example, a message "your vehicle is entering a congestion charging area") during a specific period or until the user operates the operation switch group 12 for the confirmation. In FIG. 18, this notification is displayed on a popup window 88 of the display screen 80. Such a warning notification may be made for only the congestion charging area where the entry permission flag is off. After Step 370, the program 300 ends.

In Step 380 after it has been determined that there is at least one congestion charging area whose entry permission flag is reset from on to off, in traveling on the guide route in Step 350, the entry permission flag is temporarily turned off. Then, Step 320 is executed again. The CPU 19 resets a value of the entry permission flag temporarily turned off to the former value when the program 300 ends.

When the program 300 ends, the CPU 19 starts the route guide process.

The CPU 19 executes the program 300, so that the vehicle navigation apparatus 1 calculates a guide route in accordance with set route calculation conditions (see Step 310). In this calculation, when a congestion charge is unpaid for a current day in any one of the congestion charging areas (namely, the entry permission flag of the congestion charging area is reset), when, in point groups including a current position, a destination, and intermediate points, there is no combination of two points where a route arrives in the sequential order and where one point in the earlier arrival order is outside the congestion charging area and a point in the later arrival order is inside the congestion charging area, and when a user makes a setting to avoid the congestion charging areas, a guide route avoiding an entry into the congestion charging areas is calculated.

In another case, namely, in the case where a guide route not allowing for the avoidance of the entries into the congestion charging areas is calculated, when a user makes a setting for avoiding entries into entering the congestion charging areas, a warning notification about this calculation is made to the user (see Steps 348, 370).

In the case where a guide route not allowing for the avoidance of an entry into a congestion charging area is calculated, a guide route may be recalculated (Step 380). This recalculation is made in accordance with the prospect that, when a user's vehicle travels on the calculated guide route later, the entry permission flag is turned off because a date changes in the traveling over time before the user's vehicle enters the congestion charging area (see Step 350). In this way, the guide route can be calculated in advance, taking into consideration passage of time while traveling on the guide route.

Figure 19:
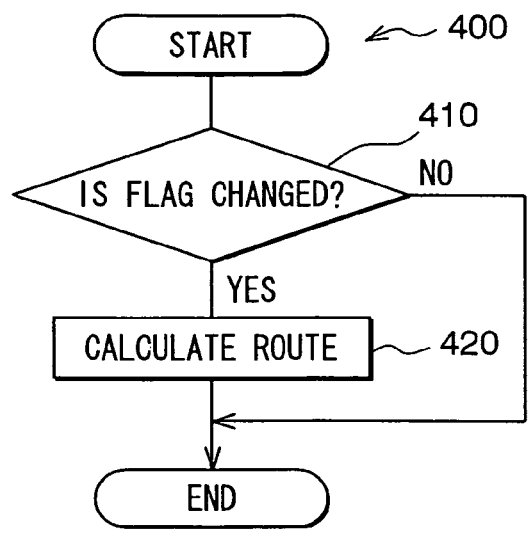
FIG. 19 is a flowchart of the program executed by the CPU, according to the first embodiment.

Next, in FIG. 19, a program 400 repeated in parallel with the guide route process being executed by the CPU 19 is shown. In executing this program, the CPU 19 determines whether, first newly in Step 410, namely after the last Step 410, a value of the entry permission flag changes. A value of the entry permission flag changes thorough the above program 500. When a value of the entry permission flag newly changes, Step 420 is executed. When a value of the entry permission flag further does not change, one execution of the program 400 ends.

In Step 420, to execute the route calculation process again, the program 300 is executed. After that, one execution of the program 400 ends.

The CPU 19 executes such a program 400, so that the vehicle navigation apparatus 1 calculates a guide route again when a date changes over time and a value of the entry permission flag changes (Step 410). Accordingly, the guide route can be changed flexibly in accordance with passage of time.

Through the above processes, the vehicle navigation apparatus 1 rewrites the payment history data where each of a plurality of the charging periods of a plurality of the congestion charging areas corresponds to whether a charge has been paid for each charging period of the congestion charging areas, in accordance with a registering operation by the user. The vehicle navigation apparatus 1 rewrites a content of the entry permission data to show that an entry is possible during the charging period, at a timing at which a date changes and at a timing at which the payment history date changes. When a content of the entry permission data shows that an entry into a congestion charging area is impossible at a current time, the vehicle navigation apparatus 1 calculates a guide route avoiding the entry into the congestion charging area. When a content of the entry permission data shows that an entry into the congestion charging area is possible at a current time, the vehicle navigation apparatus 1 calculates a guide route not allowing for the avoidance of the entry into the congestion charging area.

As described above, in accordance with information that a charge has been paid for a charging period of a congestion charging area, the vehicle navigation apparatus 1 rewrites the entry permission data. Then, in accordance with the entry permission data, the vehicle navigation apparatus 1 calculates a guide route avoiding entering the congestion charging area or not allowing for the avoidance of an entry into the congestion charging area. Accordingly, the vehicle navigation apparatus 1 can determine whether to avoid an entry into a congestion charging area, in accordance with a charge payment condition of the congestion charging area.

In the above embodiment, the programs 100, 200, 300, 400, 500, and 600 correspond to programs of the claims. The CPU 19 executes the program 500, so that the CPU 19 functions as entry permission data rewriting means of the claims. The CPU 19 executes the programs 100 to 400, so that the CPU 19 functions as guide route calculating means of the claims. The CPU 19 executes the program 600, so that the CPU 19 functions as payment history data rewriting means of the claims.

(Modifications)

In the above embodiment, the vehicle navigation apparatus 1 calculates a guide route avoiding an entry into a congestion charging area in accordance with condition. The congestion charging area herein is one example of a city area arranged to permit an entry of a vehicle during a charging period by previously paying a charge for the period. The vehicle navigation apparatus 1 may calculate a guide route avoiding an entry into a toll road arranged to permit an entry of a vehicle during a charging period by previously paying a charge for the period, in addition to such a city area. The vehicle navigation apparatus 1 may calculate a guide route avoiding an entry into a time limit charging road area including one or more links in accordance with condition.

In the above embodiment, as a change of a date as a periodical partition timing, a time 0 a.m. is used. As long as a time for the partition timing corresponds to a content of a time limit of a road area, the time is 4 a.m. or whenever.

In the above embodiment, the charging period is "a period which repeats regularly" such as a date. The period does not always need to repeat regularly.

For example, a charging period for a congestion charging area may be a period which begins at a time at which a user pays a congestion charge for the congestion charging area and ends after a predetermined time (for example, after 24 hours). In the case where a charging period for the time limit charging road area is a period which begins at a time at which a charge is paid and ends after a predetermined time, the navigation apparatus may rewrite a content of entry permission data in a storage medium into a content showing that no entry into the time limit charging road area is permitted when a predetermined time passes after a charge is paid for the time limit charging road area.

For example, a charging period of a time limit charging area may be a period in which a predetermined time passes after an entry of a user's vehicle into the time limit charging area. In such a case, the navigation apparatus may rewrite a content of the entry permission data in the storage medium when a predetermined time passes after an entry of the user's vehicle into the time limit charging area so that the content indicates that no entry is permitted into the time limit charging area.

In the above embodiment, a congestion charging area is an area arranged to permit limitless entries during a charging period when a congestion charge has been paid for the charging period. The congestion charging area does not always need to be arranged to permit limitless entries. For example, a congestion charging area may be arranged to permit only one entry during a charging period when the congestion charge has been paid for the period. In this case, the navigation apparatus may rewrite the corresponding entry permission flag so that the flag is turned from "on" to "off" when a user's vehicle enters the congestion charging area.

In some congestion charging areas, a system which always permits entries of a certain types of vehicles (for example, vehicles of inhabitants around a boundary of a congestion charging area). Namely, some vehicles have no reason for the avoidance of an entry into a time limit charging road area.

For example, when there is no reason that a vehicle having a license plate of an area name avoids an entry into a road area or when there is no reason that a vehicle having a license plate having a certain end figure avoids an entry into a road area, the vehicle navigation apparatus 1 determines whether to need to calculate a guide route avoiding an entry into the road area, in accordance with information about a license plate of a user's vehicle, the information being stored in a storage medium such as the outer storage medium 18. Only when the calculation is needed, the vehicle navigation apparatus 1 may calculate a guide route avoiding an entry into the road area.

The vehicle navigation apparatus 1 has a device for reading a detachable mobile storage medium such as a memory stick, a compact flash (registered mark), and a magnetic card. In accordance with ID information read by use of the device, the vehicle navigation apparatus 1 determines whether to need to calculate a guide route avoiding an entry into the road area. Only when the calculation is needed, the vehicle navigation apparatus 1 may calculate a guide route avoiding an entry into the road area.

Some congestion charging areas may have a system where a payment of a congestion charge is required on a day of the week and entries are always permitted on other days of the week. Namely, in some days of the week, there is no reason for avoiding an entry into a time limit charging road area.

In this case, the vehicle navigation apparatus 1 references information about whether to need to calculate a guide route road avoiding an entry into the road area on a current day of the week or on each day of the week stored in a storage medium such as the outer storage medium 18. Then, the vehicle navigation apparatus 1 may calculate a guide road avoiding an entry into the road area only when a current day is a day of the week on which an entry into the road area needs to be avoided.

Some congestion charging areas may have a system where a congestion charge needs to be paid within a time zone of a day (for example, commuter rush), and entries are always permitted in other time zones. Namely, in accordance with a time zone of a day, there is sometimes no reason for avoiding an entry into a road area.

In this case, the vehicle navigation apparatus 1 references a current time and information about a time zone in which a guide route avoiding an entry into the road area needs to be calculated, the information being stored in a storage such as the outer storage medium 18. only when the current time is a day of week in which an entry into the road area needs to be avoided, the vehicle navigation apparatus 1 may calculate a guide route avoiding an entry into the road area.

The vehicle navigation apparatus 1 may communicate with an apparatus outside a vehicle, such as a roadside apparatus by use of, e.g., a mobile phone. At this time, the vehicle navigation apparatus 1 may send its identification number to receive information about whether a vehicle corresponding to the identification number needs to avoid an entry into the road area, from the roadside apparatus. In accordance with the received information, only when required, the vehicle navigation apparatus 1 may calculate a guide route avoiding an entry into the road area.

The vehicle navigation apparatus 1 in the above embodiment is not limited to a vehicle navigation apparatus. As long as the vehicle navigation apparatus 1 is a navigation apparatus, the vehicle navigation apparatus 1 may be any types of navigation apparatus, such as a portable navigation apparatus.

In the above embodiment, a content of the payment history data is changed in accordance with an operation by a user. The navigation apparatus receives information that a charge has been paid by use of radio communications. In accordance with the information, a content of the payment history data may be changed.

The payment history data may be stored in a detachable mobile storage medium such as a memory card, in addition to the outer storage medium 18. Accordingly, this detachable mobile storage medium is installed in an outer congestion charge payment apparatus, so that a content of the payment is recorded on the detachable mobile storage medium, and then read by the vehicle navigation apparatus. As a result, the cooperation between the payment history data and the entry permission flags is possible.

The vehicle navigation apparatus 1 has the payment history data, so that the management about whether charge payments for a plurality of charging periods are made, becomes easy. The payment history data is not always needed. For example, the vehicle navigation apparatus 1 receives an operation showing that a charge of a congestion charging area has been paid for a current day, so that a value of the entry permission flag corresponding to the congestion charging area may be turned on. When a new charging period starts, a value of the entry permission flag may be turned off.

In the above embodiment, the vehicle navigation apparatus 1 shows the entry permission flag in a form of entry permission data. The entry permission data may be a form like the payment permission data. In this case, a content of the entry permission data may be changed only when a charge is paid, but may not be changed when a new charging period starts.

Thus, the navigation apparatus includes a storage medium for storing entry permission data which shows information about an entry permission for a time limit charging road area. The navigation apparatus rewrites a content of the entry permission data into the content showing that an entry into a time limit charging road area on a charging period is permitted, in accordance with information that the charge for the time limit charging road area on the charging period has been paid. The navigation apparatus calculates a guide route for avoiding an entry into a time limit charging road area, in accordance with a content of the entry permission data showing that no entry into the time limit charging road area is permitted at the current time. The navigation apparatus calculates a guide route not allowing for the avoidance of an entry into a time limit charging road area, in accordance with the entry permission data showing that an entry into the time limit charging road area is permitted at the current time.

As described above, the navigation apparatus rewrites entry permission data in accordance with information showing that a charge for a time limit charging road area during a charging period has been paid. Further, the navigation apparatus calculates a guide route for avoiding an entry into the time limit charging road area or a guide route not allowing for the avoidance, in accordance with the entry permission data. Accordingly, the navigation apparatus can determine whether to avoid an entry into the time limit charging road area in accordance with payment condition of the time limit charging road area.

The road area is an area including at least one link. For example, the road area may be one road, or may be one entire city including many roads. The rewriting is a concept including addition, deletion, and overwriting.

A difference between a calculation of a guide route avoiding an entry into a time limit charging road area and a calculation of a guide route not allowing for the avoidance of an entry into the time limit charging road area is as follows. For example, in calculating a guide route which costs least in a plurality of routes, the latter route is provided with a lower cost than the former route, relative to a route entering the time limit charging road area.

When a charging period of a time limit charging road area repeats regularly, the navigation apparatus may rewrite a content of the entry permission data into the content showing that an entry into the time limit charging road area is not permitted, in response to a starting timing of a new charging period.

Accordingly, after a charging period of a time limit charging road area for which a charge has been paid is changed to the new charging period, a guide route for avoiding the time limit charging road area can be calculated.

When the indication that a charge has been paid corresponds to a charging period beginning from the current time or including the current time in payment history data where a plurality of charging periods of a time limit charging road area correspond to whether charges have been paid for respective charging periods of the time limit charging road area, the navigation system may rewrite a content of the entry permission data into a content showing that an entry into the time limit charging road area is permitted.

By use of such a payment history data, it is easy to manage whether charges have been paid for a plurality of charging periods.

The payment history data may be, for example, a list of all the charging periods for which charges have been paid. Charging periods not contained in such a list are clearly ones for which charges are unpaid. Therefore, the list can be said to correspond a plurality of charging periods to whether charges have been paid for the time limit charging road area during the charging periods. A list of all the charging periods for which charges are unpaid is also the payment history data.

The navigation apparatus may rewrite a content of the payment history data into a content showing that no entry into the time limit charging road area during the charging period is permitted, in accordance with the correspondence between a charging period beginning from a current time or including the current time and a fact that a charge is unpaid, in the payment history data.

In these cases, the navigation apparatus may rewrite a content of the entry permission data at a timing at which a content of the payment history data changes. Accordingly, a content of the entry permission data rapidly responds to a change of the payment history data.

When this payment history data is stored in the storage medium, the navigation apparatus may rewrite in accordance with an input operation by a user.

Accordingly, by changing the payment history by use of a manual input by the user, the user can provide information about the charge payment to the navigation apparatus.

The navigation apparatus may calculate a guide route again at a timing at which a content of the entry permission data changes. Accordingly, the navigation apparatus can calculate a guide route rapidly in response to a change of the entry permission data.

The navigation apparatus predicts that, in the case where a user's vehicle travels on a calculated guide route entering a time limit charging road area later over time, before the vehicle enters the time limit charging road area, the entry permission data shows that no entry into the time limit charging area is permitted during a charging period beginning before the entry of the vehicle. Then, in accordance with the entry permission data showing that no entry is permitted, the navigation apparatus may calculate a guide route again.

Accordingly, in consideration of passage of a time for the traveling on the guide route, a guide route can be previously calculated.

When a current position is outside the time limit charging road area and a set destination is outside the time limit charging road area, the navigation apparatus may calculate a guide route avoiding an entry into the time limit charging road area.

When a current position is inside the time limit charging road area and a set destination is outside the time limit charging road area, the navigation apparatus may calculate a guide route avoiding an entry into the time limit charging road area.

Accordingly, a guide route from a point inside the time limit charging road area to a point outside the time limit charging road area, can avoid entering the time limit charging road area after going out of the time limit charging road area once. This is effective especially when the time limit charging road area has a distorted geographic shape.

When a current position is inside the time limit charging road area and a set destination is inside the time limit charging road area, the navigation apparatus may calculate a guide route avoiding an entry into the time limit charging road area.

Accordingly, a guide route from a point inside the time limit charging road area to a point outside the time limit charging road area, can avoid entering the time limit charging road area after going out of the time limit charging road area once. This is effective especially when the time limit charging road area has a distorted geographic shape.

When a current position is outside the time limit charging road area and a set destination is inside the time limit charging road area, the navigation apparatus may calculate a guide route not allowing for the avoidance of an entry into the time limit charging road area. Accordingly, the navigation apparatus can respond to the case where a user tries to pay a charge for the time limit charging road area before the time limit charging road area on the way of a guide route.

When at least one of combinations of two points which are set in the sequential arrival order in a point group including a current position, a set destination, and set intermediate points is such that the point in the earlier arrival order is outside the time limit charging road area and the point in the later arrival order is inside the time limit charging road area, the navigation apparatus may calculate a guide route not allowing for the avoidance of an entry into the time limit charging road area. Accordingly, the navigation apparatus can respond to the case where a user tries to pay a charge for the time limit charging road area before the time limit charging road area on the way of a guide route.

In accordance with information about a license plate of a user's vehicle stored in a storage medium, the navigation apparatus may calculate a guide route avoiding an entry into a time limit charging road area where the license plate is not exempt from a charge.

Accordingly, the navigation apparatus can respond to the case where each vehicle (for example, each end numeral of license plates) differs in the charge exemption in the limit charging road area.

In accordance with information acquired from outside a vehicle by use of radio communications, the navigation apparatus may calculate a guide route avoiding an entry into a time limit charging road area. Accordingly, the navigation apparatus can acquire information about whether a user's vehicle needs to avoid entering the time limit charging road area, from the outside.

When a user makes a setting for avoiding an entry into a time limit charging road area, the navigation apparatus may calculate a guide route avoiding an entry into the time limit charging road area. Accordingly, a guide route can be calculated in accordance with the preferences of the user.

When the navigation apparatus calculates a guide route not allowing for the avoidance of entry into a time limit charging road area although a user makes a setting for avoiding an entry into a time limit charging road area, the navigation apparatus may notify the user about the guide route.

Accordingly, when the navigation apparatus does not allow for the avoidance of entry into the time limit charging road area although a setting is made so that an entry into the time limit charging road area is avoided, the notification is made to the user. Therefore, the user can reduce uncomfortable feeling.

The phrase "when . . . calculates" means a concept including the case where a setting is not changed in the future, the case where a guide route not allowing for the avoidance of an entry into the time limit charging road area is made, and the case where the route is being calculated.

Through the same viewpoint, when the navigation apparatus calculates a guide route entering the time limit charging road area although a user makes a setting for avoiding an entry into the time limit charging road area, the navigation apparatus may notify the user about the guide route.

Through the same viewpoint, when a destination or intermediate points are set in a time limit charging road area, the navigation apparatus may notify the user about the setting.

The navigation apparatus may calculate a guide route not allowing for the avoidance of entries into the upper limit number of a plurality of time limit charging road areas, and avoiding entries into other time limit charging road areas. Accordingly, a plurality of the time limit charging road areas can be divided into areas where an entry is avoided and areas where an entry is not avoided, in accordance with the upper limit number.

The navigation apparatus may calculate a guide route not allowing for the avoidance of entries into a plurality of time limit charging road areas whose total charge is not over an upper limit amount, and avoiding entries into other time limit charging road areas. Accordingly, a plurality of the time limit charging road areas can be divided into areas where an entry is avoided and areas where an entry is not avoided, in accordance with the upper limit amount.

Characteristics of the above-described present invention are as follows. An entry permission data rewriting function rewrites a content of entry permission data stored in a storage medium. The entry permission data shows information about permission of an entry into a time limit charging road area. The time limit charging road area is arranged to permit an entry of a vehicle during a charging period for which a charge is previously paid. The content is rewritten in accordance with information that a charge has been paid for the charging period of the time limit charging road area. The rewritten content shows that an entry into the time limit charging road area during the charging period is permitted. A guide route calculating function calculates a guide route avoiding an entry into a time limit charging road area in accordance with a content of the entry permission data showing that no entry into the road area is permitted at the current time. The guide route calculating function calculates a guide route not allowing for the avoidance of an entry into a road area in accordance with a content of the entry permission data showing that an entry into the road area is permitted at the current time. These functions can be achieved as programs in a computer.

Second Embodiment

Figure 20:
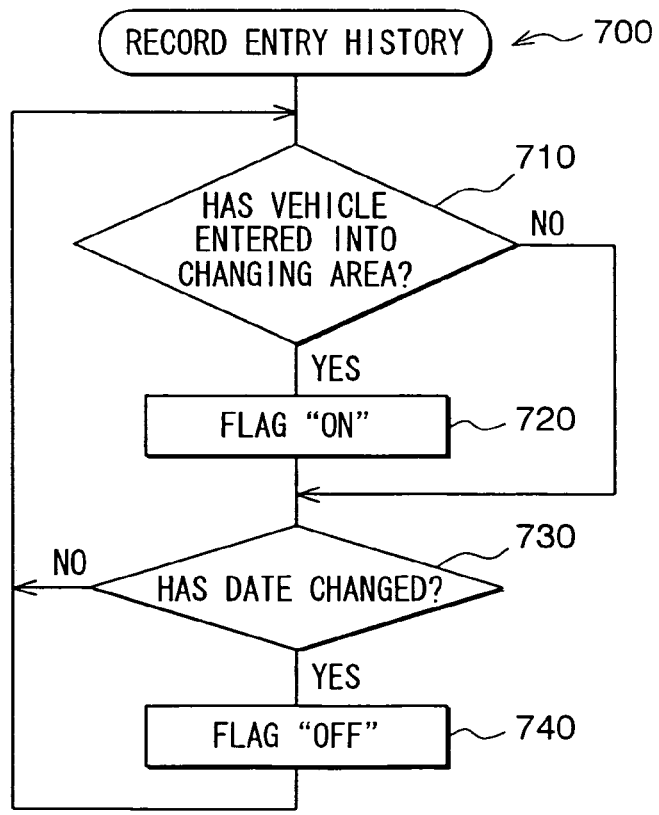
FIG. 20 is a flowchart of a program executed by a CPU, according to a second embodiment of the present invention.

FIG. 20 is a flowchart of a program executed by a CPU, according to a second embodiment of the present invention.

The map data has road data and facility data. The road data includes positions and types of road strips (links) and intersections (nodes) and information about connection relationships between the intersections and road strips. The facility data includes a plurality of entries of facilities. Each entry includes name information, location information, type information, and the like about a target facility. In this embodiment, the map data includes data about congestion charging areas. The congestion charging area herein includes one or more road strips. The congestion charging area introduces a system where the first time a vehicle enters the area on a certain day, the vehicle needs to pay an entry charge for that day, and once the vehicle pays the charge, the vehicle is not charged again no matter how many times the vehicle enters the area on that day after the first entry. The data of the congestion charging areas is, more specifically, data for specifying road strips in each congestion charging area.

When a driver does not want to pay such a congestion charge, it is determined whether his or her own vehicle is to avoid an entry into the congestion charging area in accordance with whether the vehicle has entered the congestion charging area at least once.

An entry history flag is a flag provided to each congestion charging area. As described later, the entry history flag is used for determining whether a user's vehicle is to avoid an entry into a congestion charging area. The entry history flag includes information about whether the vehicle has entered a target congestion charging area at least once.

The entry history recording process is to change a value of the above entry history flag. In FIG. 20, a program 700 executed by the CPU 19 for the entry history recording process is shown. Just after the activation, the CPU 19 executes the program 700. In Step 710, after the last Step 710, the CPU 19 determines whether a user's vehicle has entered a congestion charging area in accordance with a current position of the vehicle and data of the congestion charging area in map data. When the vehicle is determined to have entered the area, the CPU 19 changes an entry history flag of the congestion charging area to "on" in Step 720. Then, the CPU 19 executes Step 730.

When the vehicle is determined not to have entered the area, the CPU 19 determines whether a date has changed after the last Step 730, namely, whether a time has exceeded 0 a.m., in Step 730. When the date has changed, the CPU 19 changes all the entry history flags to "off" in Step 740. When the date has not changed, the CPU 19 executes Step 710.

The CPU 19 repeats Step 710 to 740. Accordingly, the vehicle navigation apparatus 1 sets an entry history flag of each congestion charging area to "on" when a user's vehicle enters the congestion charging area (Steps 710, 720), and sets the entry history flag to "off" at a change of a date as a periodical interval timing.

Next, the guide calculating process executed by the CPU 19 is explained in detail. In this guide calculating process, the CPU 19 of this embodiment determines whether to calculate a guide route avoiding an entry into a congestion charging area or a guide route not allowing for the avoidance of an entry into the congestion charging area in accordance with, e.g., an entry history flag corresponding to the congestion charging area.

In FIG. 21, one example of the guide route calculation is shown in a form of a table. The CPU 19 executes this exampled calculation when a destination is set, intermediate points are not set, a setting flag corresponding to the congestion charge possible button 65 is off, and the highlight selection information shows that any of the total amount button 71, the entered area number button 73, and the individual setting button 75 are not highlighted. As shown in FIG. 13, the CPU 19 calculates a guide route not allowing for the entry into the congestion charging area where there is at least one entry on a current day, namely, the corresponding entry history flag is on, regardless of a stating point (current position) and a destination.

The CPU 19 calculates a guide route avoiding an entry into the congestion charging area where there is no entry on a current day, namely, the corresponding entry history flag is off, when a current position is outside the congestion charging area and a destination is outside the congestion charging area, when a current position is inside the congestion charging area and a destination is outside the congestion charging area, and when a current position is inside the congestion charging area and a destination is inside the congestion charging area.

Accordingly, a guide route from a point outside the congestion charging area to a point outside the congestion charging area can be prevented from entering the congestion charging area once. A route from a point inside the congestion charging area to a point outside the congestion charging area can be prevented from entering the congestion charging area after going out of the congestion charging area. A route from a point inside the congestion charging area to a point outside the congestion charging area can be prevented from entering the congestion charging area after going out of the congestion charging area. This is effective when the congestion charging area has a distorted geographic shape.

The CPU 19 may calculate a guide route not allowing for the avoidance of the entry into the congestion charging area where there is no entry on a current day, namely, the corresponding entry history flag is off, when a current position is outside the congestion charging area and a destination is inside the congestion charging area. When a current position is outside the congestion charging area and a set destination is inside the congestion charging area, a user's vehicle enters the congestion charging area at least once unless a very rare condition occurs. Therefore, it is almost meaningless to calculate a route avoiding an entry into the congestion charging area.

Figure 15:
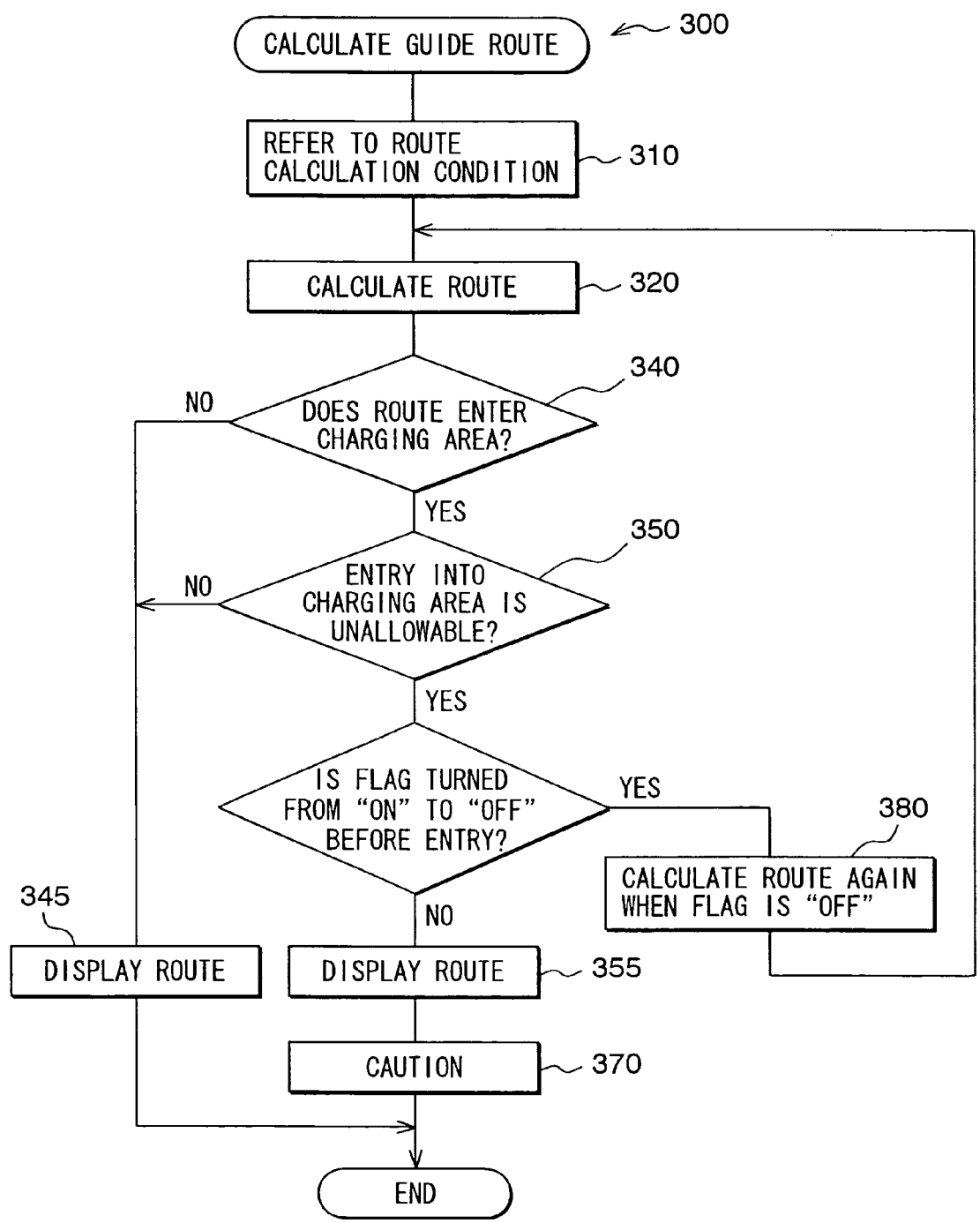
FIG. 15 is a flowchart of a program executed by the CPU, according to the first embodiment.

Regarding FIG. 15 according to the first embodiment, in Step 350, the relationship between progress and time of a traveling of a user's vehicle when the vehicle starts traveling on the guide route at a current time (or a starting time specified by a user by use of the operation switch group 12) is specified in accordance with average speeds, speed limits, and the like in road strips of the guide route previously recorded on the map data. In accordance with the relationship, it is determined whether, in the congestion charging areas to be entered, there is at least one congestion charging area whose entry history flag is reset from "on" to "off" before the vehicle enters the congestion charging area because a date changes during the traveling over time. When there is such a congestion charging area, Step 380 is executed. When there is no such a congestion charging area, the same guide route display as in Step 345 is made in Step 355.

After Step 355, in Step 370, the image display device 13 and the speaker 14 are made to make a notification that a guide route entering a congestion charging area has been calculated (for example, a message "your vehicle is entering a congestion charging area") during a specific period or until the user operates the operation switch group 12 for the confirmation. Such a warning notification may be made for only the congestion charging area where the entry history flag is off. In FIG. 18, this notification is displayed on a popup window 88 of the display screen 80. After Step 370, the program 300 ends.

In Step 380 after it has been determined that there is at least one congestion charging area whose entry history flag is reset from "on" to "off", in traveling on the guide route in Step 350, the entry history flag is temporarily turned off. Then, Step 320 is executed again. The CPU 19 resets a value of the entry history flag temporarily turned off to the former value when the program 300 ends.

When the program 300 ends, the CPU 19 starts the route guide process.

The CPU 19 executes the program 300, so that the vehicle navigation apparatus 1 calculates a guide route (see Step 320) in accordance with set route calculation conditions (see Step 310). In this calculation, when the vehicle navigation apparatus has not entered any one of the congestion charging areas from a change of a date to a current time (namely, the entry history flag of the congestion charging area has been reset), when, in a point group including a current position, a destination, and intermediate points, no combination of two points which are set in the sequential arrival order is such that one point in the earlier arrival order is outside the congestion charging area and the other point in the later arrival order is inside the congestion charging area, and when a user makes a setting to avoid the congestion charging areas, a guide route avoiding an entry into the congestion charging area is calculated.

In another case, namely, in the case where a guide route not allowing for the avoidance of an entry into the congestion charging area is calculated, when a user makes a setting for avoiding an entry into the congestion charging area, a warning notification about this calculation is made to the user (see Step 348, 370).

In the case where a guide route not allowing for the avoidance of an entry into a congestion charging area is calculated, a guide route may be recalculated (Step 380). This recalculation is made in accordance with the prospect that, when a user's vehicle travels on the calculated guide route later over time, the entry history flag of the congestion charging area is turned off because a date changes before the user's vehicle enters the congestion charging area (see Step 350). Accordingly, a guide route can be calculated in advance in consideration of passage of time of traveling on the guide route.

Next, in FIG. 19, a program 400 repeated in parallel with the guide route process being executed by the CPU 19 is shown. In executing this program, the CPU 19 determines whether, first newly in Step 410, namely after the last Step 410, a value of the entry history flag changes. A value of the entry history flag changes thorough the above program 500. When a value of the entry history flag newly changes, Step 420 is executed. When a value of the entry history flag does not change, one execution of the program 400 ends.

In Step 420, to execute the route calculation process again, the program 300 is executed. After that, one execution of the program 400 ends.

The CPU 19 executes such a program 400, so that the vehicle navigation apparatus 1 calculates a guide route again when a date changes over time and a value of the entry history flag changes (Step 410). Accordingly, the guide route can be changed flexibly in accordance with passage of time.

Through the above processes, the vehicle navigation 1 stores an entry history into a congestion charging area in a storage medium. The vehicle navigation 1 calculates a guide route avoiding an entry into the congestion charging area when the navigation apparatus has not entered the congestion charging area on a current day. By storing the entry history into the congestion charging area in the storage medium, the navigation apparatus can determine whether to avoid an entry into a congestion charging area in accordance with the stored entry history into the congestion charging area, in calculating a guide route.

In the above embodiment, the programs 100, 200, 300, 400, and 500 correspond to programs of the claims. The CPU 19 executes the program 500, so that the CPU 19 functions as storage controlling means of the claims. The CPU 19 executes the programs 100 to 400, so that the CPU 19 functions as guide route calculating means of the claims.

(Modifications)

In the above embodiment, the vehicle navigation apparatus 1 calculates a guide route avoiding an entry into a congestion charging area in accordance with condition. The congestion charging area herein is one example of a city area arranged to determine a charge amount charged on a vehicle in accordance with the entry history of the vehicle into the area. In addition to such a city area, the vehicle navigation apparatus 1 may calculate a guide route avoiding an entry into a toll road arranged to determine a charge amount charged on a vehicle in accordance with the entry history of the vehicle into the road. The vehicle navigation apparatus 1 may calculate a guide route avoiding an entry into a road area including one or more links in accordance with condition.

In the above embodiment, as a change of a date as a periodical interval timing, a time 0 a.m. is used. As long as a time for the interval timing corresponds to a content of a time limit of a road area, the time may be any time such as 4 a.m.

In the above embodiment, the vehicle navigation apparatus 1 calculates a guide route avoiding an entry into the congestion charging area when the navigation apparatus has not entered the congestion charging area "from the last interval timing in periodical interval timings to a current time". This is not always needed.

For example, the vehicle navigation apparatus 1 may avoid an entry into the congestion charging area when the navigation apparatus has not entered the congestion charging area "from a predetermined time before to a current time". Accordingly, the vehicle navigation apparatus 1 can respond to the case where once the navigation apparatus enters the road area, there is no reason for avoiding another entry into the road area.

In this case, as a method for determining that the navigation apparatus has not entered the road area from a predetermined time before to a current time, instead of using the entry history flag, the vehicle navigation apparatus 1 stores an entry time of a user's vehicle into a road area in a storage medium as an entry history when the vehicle enters the road area. When a last entry time into the road area in the entry history is before the predetermined time before a current time, the vehicle navigation apparatus 1 may calculate a guide route avoiding an entry into the road area. The interval timing and predetermined time may differ in accordance with each road area.

Accordingly, the vehicle navigation apparatus 1 may calculate a guide route avoiding an entry into the road area when the navigation apparatus has not entered the road area during a period from a past time to a current time.

In the above embodiment, the vehicle navigation apparatus 1 may calculate a guide route avoiding an entry into the road area when the navigation apparatus has not entered the road area during a period from a past time from a current time. This is not always needed.

In the case where, during a period from a past time to a current time, a vehicle is not charged when the vehicle enters the road area once, and the vehicle is charged when the vehicle enters the road area twice or more, the vehicle navigation apparatus 1 may calculate a guide route avoiding an entry into the road area when the vehicle navigation apparatus 1 "has" entered the road area during a period from a past time from a current time.

In some congestion charging areas, there may be a system arranged not to charge on some types of vehicles (for example, the vehicles registered in a specific area) at all. Some vehicles may have no reason for avoiding an entry into a road area.

For example, when there is no reason that a vehicle having a license plate of an area name avoids an entry into a road area or when there is no reason that a vehicle having a license plate having a certain end figure avoids an entry into a road area, the vehicle navigation apparatus 1 determines whether to need to calculate a guide route avoiding an entry into the road area, in accordance with information about a license plate of a user's vehicle, the information being stored in a storage medium such as the outer storage medium 18. Only when the calculation is needed, the vehicle navigation apparatus 1 may calculate a guide route avoiding an entry into the road area.

Some congestion charging areas may have a system where a payment of a congestion charge is required on a day of the week and no charge is required on the other days of the week. Namely, in some days of the week, there is no reason for avoiding an entry into a road area.

In this case, in accordance with a current day of the week and information about whether to need to calculate a guide route road avoiding an entry into the road area on a current day of the week and on each day of the week, the information being stored in a storage medium such as the outer storage medium 18. Then, the vehicle navigation apparatus 1 may calculate a guide road avoiding an entry into the road area only when a current day is a day of week on which an entry into the road area needs to be avoided.

Some congestion charging areas may have a system where a congestion charge needs to be paid within a time zone of a day (for example, commuter rush), and entries are always permitted in other time zones. Namely, in accordance with a time zone of a day, there is sometimes no reason for avoiding an entry into a road area.

In this case, the vehicle navigation apparatus 1 references a current time and information about a time zone in which a guide route avoiding an entry into the road area needs to be calculated, the information being stored in a storage medium such as the outer storage medium 18. Only when the current time is on a day of week in which an entry into the road area needs to be avoided, the vehicle navigation apparatus 1 may calculate a guide route avoiding an entry into the road area.

The vehicle navigation apparatus 1 may communicate with an apparatus outside a vehicle, such as a roadside apparatus by use of, e.g., a mobile phone. At this time, the vehicle navigation apparatus 1 may send its identification number to receive information about whether a vehicle corresponding to the identification number needs to avoid an entry into the road area, from the roadside apparatus. In accordance with the received information, only when required, the vehicle navigation apparatus 1 may calculate a guide route avoiding an entry into the road area.

In the above embodiment, there are a plurality of road areas whose entry histories are to be stored. There may be one road area whose entry history is to be stored.

The vehicle navigation apparatus 1 in the above embodiment is not limited to a vehicle navigation apparatus. As long as the vehicle navigation apparatus 1 is a navigation apparatus, the vehicle navigation apparatus 1 may be any types of navigation apparatuses, such as a portable navigation apparatus.

Thus, the navigation apparatus stores an entry history into a road area in a storage medium. In accordance with the entry history into a road area stored in the storage medium, the navigation apparatus calculates a guide route avoiding an entry into the road area. Accordingly, the entry history into a road area is stored in a storage medium, so that the navigation apparatus can determine whether to avoid an entry into the road area in calculating a guide route in accordance with the entry history into the stored road area.

The road area is an area including at least one link, such as one road and one entire city including many roads.

The navigation apparatus may calculate a guide route avoiding an entry into the road area when the navigation apparatus has not entered the road area during a period from a past time to a current time.

Accordingly, the navigation apparatus can respond to the case where once there is an entry into a road area during a period, there is no reason for avoiding another entry into the road area during the period, as well as the case where once there is an entry during a period from a past time to a current time, a charge amount does not change no matter how many entries there are during the period.

The past time herein may be a last interval timing in periodical interval timings. Accordingly, the navigation apparatus can respond to the case where once there is an entry during an equally divided period, there is no reason for avoiding another entry into the road area during the period.

The interval timing may be 0 a.m. in each day. Accordingly, the navigation apparatus can respond to the case where once there is an entry on a date, there is no reason for avoiding another entry into the road area during the date.

As a method for the operation when the navigation apparatus has not entered the road area during a period from an interval timing to a current time, the navigation apparatus may set a flag as an entry history when a user's vehicle enters the road area. The navigation apparatus may reset the flag at the interval timing. When the flag has been reset, the navigation apparatus may calculate a guide route avoiding an entry into the road area.

A past time may be a predetermined time before a current time. Accordingly, the navigation apparatus can respond to the case where once there is an entry, there is no reason for avoiding another entry into the road area until the predetermined time passes after the first entry.

A method for the operation when the navigation apparatus has not entered the road area during a period from the predetermined time before to a current time is as follows. An entry time at which a user's vehicle enters a road area is stored in an entry history. When a last entry time into the road area, the time being stored in the entry history, is before the predetermined time before a current time, the navigation apparatus may calculate a guide route avoiding an entry into the road area.

When a date including the past time changes over time to change whether the navigation apparatus has entered the road area during a period from a past time to a current time before the user's vehicle enters the road area, the navigation apparatus may calculate a guide route again. Accordingly, a guide route can be changed flexibly in accordance with passage of time.

In accordance with a prediction that, when a user's vehicle travels on a calculated guide route over time and a date including a past time changes, there is a change in whether the navigation apparatus has entered the road area during a period from the past time to a current time, and in accordance with the state after this change, the navigation apparatus may calculate a guide route again. Accordingly, in consideration of passage of time in traveling on a guide route, the guide route can be calculated in advance.

When a current position is outside the road area and a set destination is outside the road area, the navigation apparatus may calculate a guide route avoiding an entry into the road area.

When a current position is inside the road area and a set destination is outside the road area, the navigation apparatus may calculate a guide route avoiding an entry into the road area. Accordingly, a guide route from a point inside the road area to a point outside the road area, can avoid entering the road area after going out of the road area once. This is effective especially when the road area has a distorted geographic shape.

When a current position is inside the road area and a set destination is inside the road area, the navigation apparatus may avoid an entry into the road area. Accordingly, a guide route from a point inside the road area to a point outside the road area, can avoid entering the road area after going out of the road area once. This is effective especially when the road area has a distorted geographic shape.

When a current position is outside the road area and a set destination is inside the road area, the navigation apparatus may calculate a guide route not allowing for the avoidance of an entry into the road area. When a current position is outside the road area and a set destination is inside the road area, a user's vehicle enters the road area at least once unless an extremely rare condition occurs. Therefore, it is almost meaningless to calculate a guide route avoiding the road area.

A difference between a calculation of a guide route avoiding an entry into a time limit charging road area and a calculation of a guide route not allowing for the avoidance of an entry into the time limit charging road area is as follows. For example, in calculating a guide route which costs least in a plurality of routes, the latter route is provided with a lower cost than the former route, relative to a route entering the time limit charging road area.

When at least one of combinations of two points which are set in the sequential arrival order in a point group including a current position, a set destination, and set intermediate points is such that one point in the earlier arrival order is outside the road area and the other point in the later arrival order is inside the road area, the navigation apparatus may calculate a guide route not allowing for the avoidance of an entry into the road area. When at least one of combinations of two points which are set in the sequential arrival order in a current position, a set destination, and set intermediate points is such that one point in the earlier arrival order is outside the road area and the other point in the later arrival order is inside the road area, a user's vehicle enters the road area at least once unless an extremely rare condition occurs. Therefore, it is almost meaningless to calculate a guide route avoiding the road area.

In accordance with information about a license plate of a user's vehicle stored in a storage medium, the navigation apparatus may calculate a guide route avoiding en entry into the road area. Accordingly, the navigation apparatus can respond to the case where there is a difference in whether to avoid an entry into the road area in accordance with each vehicle (for example, each last numeral of a license plate).

In accordance with a current day of the week, the navigation apparatus may calculate a guide route avoiding an entry into the road area. Accordingly, the navigation apparatus can respond to the case where there is a difference in whether to avoid an entry into the road area in accordance with each day of the week.

In accordance with a current time, the navigation apparatus may calculate a guide route avoiding an entry into the road area. Accordingly, the navigation apparatus can respond to the case where there is a difference in whether to avoid an entry into the road area in accordance with a time zone including a current time.

The current time is information about what time it is now, regardless of a date.

In accordance with information acquired from outside a vehicle by use of radio communications, the navigation apparatus may calculate a guide route avoiding an entry into the road area. Accordingly, the navigation apparatus can acquire information about whether to need to avoid an entry into the road area from the outside.

When a user makes a setting for avoiding an entry into the road area, the navigation apparatus may calculate a guide route avoiding an entry into the road area. Accordingly, a guide route can be calculated in accordance with a preference of the user.

In this case, when the navigation apparatus calculates a guide route not allowing for the avoidance of an entry into the road area although a user makes a setting for avoiding an entry into the road area, the navigation apparatus may notify the user about the guide route. Accordingly, when the navigation apparatus does not allow for the avoidance of an entry into the road area regardless of the setting for avoiding an entry into the road area, the user is notified about the guide route, so that the user can reduce uncomfortable feeling.

The phrase "when . . . calculates" means a concept including the case where a setting is not changed in the future, the case where a guide route not allowing for the avoidance of an entry into the road area is calculated, and the case where the route is being calculated.

Through the same viewpoint, when the navigation apparatus calculates a guide route entering the road area although a user makes a setting for avoiding an entry into the road area, the navigation apparatus may notify a user about the guide route.

Accordingly, the user can reduce uncomfortable feeling.

When a destination or intermediate points are set inside the road area, the navigation apparatus may notify a user about the setting.

The navigation apparatus may store entry histories into a plurality of respective road areas in a storage medium. The navigation apparatus may calculate a guide route avoiding at least one of a plurality of the road areas in accordance with the entry histories into the plurality of the road areas stored in the storage medium.

The navigation apparatus may calculate a guide route not allowing for the avoidance of the entries into the upper limit number of the road areas but avoiding the entries into the other road areas. Accordingly, the road areas can be divided into the areas where entries are avoided and the areas where entries are not avoided, in accordance with a limit of the upper limit number.

The navigation apparatus may calculate a guide route not allowing for the avoidance of entries into a plurality of the road areas in which a charge for an entry is set and the total charge amount for which is not over an upper limit amount, but avoiding entries into the other road areas. Accordingly, a plurality of the road areas can be divided into the areas where entries are avoided and the areas where entries are not avoided, in accordance with the upper limit amount.

The road area may be a city area arranged to set a charge amount for a vehicle in accordance with an entry history of the vehicle into the road area.

The road area may be a toll road arranged to set a charge amount for a vehicle in accordance with an entry history of the vehicle into the road area.

The present invention can also be a program for achieving the following functions in a computer. An entry history into a road area is stored in a storage medium. A guide route avoiding an entry into a road area is calculated in accordance with the entry history into the road area stored in the storage medium.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A navigation apparatus of a vehicle comprising:
   storage means for storing information about the vehicle and a road area; and
   guide route calculating means for calculating a guide route on the basis of the information stored in the storage means, wherein
   the storage means is a storage medium for storing an entry history of the road area,
   the guide route calculating means calculates the guide route avoiding entry of the vehicle into the road area in accordance with the entry history of the road area, and
   the guide route calculating means calculates the guide route avoiding the entry of the vehicle into the road area when the vehicle has not entered the road area during a predetermined period from a past time to a current time so that the entry history is reset at every predetermined period.

2. The navigation apparatus according to claim 1, wherein the past time is a last interval timing in periodical interval timings.

3. The navigation apparatus according to claim 2, wherein the interval timing starts at 0 a.m. on each day.

4. The navigation apparatus according to claim 2, wherein the storage means sets a flag as the entry history when the vehicle enters the road area, the storage means resets the flag at the interval timing, and the guide route calculating means calculates the guide route avoiding the entry of the vehicle into the road area when the flag is reset.

5. The navigation apparatus according to claim 1, wherein the past time is prior to a predetermined time before a current time.

6. The navigation apparatus according to claim 5, wherein the storage means stores an entry time of the vehicle as the entry history in the storage medium when the vehicle enters the road area, and
   the guide route calculating means calculates the guide route avoiding the entry of the vehicle into the road area when a last entry time of the road area in the entry history is prior to the predetermined time before the current time.

7. The navigation apparatus according to claim 1, wherein the guide route calculating means calculates the guide route again when a date of the past time is changed as time advances so that the entry history of the road area during a period from the past time to the current time is changed.

8. The navigation apparatus according to claim 1, wherein the guide route calculating means calculates the guide route again on the basis of a prediction that a date of the past time is changed as time advances so that the entry history of the road area during a period from the past time to the current time is changed, if the vehicle travels on a calculated guide route, since the time advances before the vehicle enters the road area.

\* \* \* \* \*